United States Patent
Ishii et al.

(10) Patent No.: US 7,081,741 B2
(45) Date of Patent: Jul. 25, 2006

(54) MULTI-OUTPUT POWER SUPPLY AND ELECTRONIC DEVICE USING THEM

(75) Inventors: Takuya Ishii, Osaka (JP); Takashi Ryu, Kyoto (JP); Mikio Motomori, Hirakata (JP); Hirohisa Tanabe, Nagaokakyo (JP); Masato Yoshida, Takatsuki (JP); Kazuhito Kimura, Kyotanabe (JP); Tomoya Shigemi, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/153,230

(22) Filed: Jun. 15, 2005

(65) Prior Publication Data

US 2006/0044724 A1    Mar. 2, 2006

(30) Foreign Application Priority Data

Jun. 15, 2004    (JP) .............................. 2004-177041

(51) Int. Cl.
G05F 1/577    (2006.01)
(52) U.S. Cl. ...................................... 323/267
(58) Field of Classification Search ................ 323/267, 323/268, 271, 272; 307/11, 43, 52, 82
See application file for complete search history.

(56) References Cited

U.S. PATENT DOCUMENTS

| 6,603,671 | B1* | 8/2003 | Tokunaga et al. .............. 363/17 |
| 6,831,448 | B1* | 12/2004 | Ishii et al. ................... 323/282 |
| 6,864,670 | B1* | 3/2005 | Ouyang et al. .............. 323/271 |
| 6,903,535 | B1* | 6/2005 | Liu et al. ..................... 323/222 |
| 6,946,820 | B1* | 9/2005 | Ishii et al. ................... 323/222 |

FOREIGN PATENT DOCUMENTS

JP    8-11055    3/1996

\* cited by examiner

*Primary Examiner*—Adolf Berhane
(74) *Attorney, Agent, or Firm*—Harness, Dickey & Pierce, P.L.L.C.

(57) ABSTRACT

For controlling DC-DC converters conforming to voltage mode control system and current mode control system, in multi-output power supply, first converter section 2 is configured that first detection circuit 31 outputs first control signal, that first oscillation circuit 32 outputs first triangular wave signal and clock signal, and that first pulse-width modulation circuit 33 drives first switch by comparing first control signal with first triangular wave signal. Second converter section 4 is configured that second detection circuit 34 outputs second control signal, that second oscillation circuit 35 outputs second triangular wave signal synchronized with clock signal, that current detection circuit 36 outputs current signal of second inductor, and that second pulse-width modulation circuit 37 turns ON second switch in synchronization with clock signal and turns OFF second switch by calculating or comparing second control signal, the second triangular wave signal and current signal.

10 Claims, 12 Drawing Sheets

PRIOR ART

MULTI-OUTPUT POWER SUPPLY AND ELECTRONIC DEVICE USING THEM

BACKGROUND OF THE INVENTION

The present invention relates to a multi-output power supply, comprising multiple switching power supplies provided in parallel, for supplying powers having various specifications to multiple loads, and to an electronic device using the multiple switching power supply.

In recent years, for the purpose of meeting the needs for energy conservation, some electronic devices are configured that the operations of the electronic circuits provided therein are temporarily suppressed or stopped according to the working environment and working conditions thereof. Furthermore, recent electronic devices are ingeniously designed to reduce power consumption as much as possible by optimally changing the voltage of the power supply thereof.

Moreover, although conventional electronic devices are each configured to drive multiple load circuits using one power supply voltage, recent electronic devices are each required to generate different power supply voltages so that optimum power supply voltages are supplied to the respective multiple load circuits thereof. Hence, for the purpose of meeting such a need, a conventional power supply is configured to comprise multiple switching power supplies provided in parallel so that individually-controlled powers are output to respective load circuits. Such a multi-output switching power supply is required to comprise devices having quick response to changes in the output specifications in each load circuit. For the purpose of responding to such changes in the output specifications, a control method wherein not only the output voltage but also the output current of a step-down switching power supply is detected to respond to abrupt changes in load has been disclosed in the publication of examined Japanese Utility Model Application, Publication No. Hei 8-11055, for example. The operation of the step-down switching power supply described in the Japanese Utility Model Publication No. Hei 8-11055 will be described below using FIG. 11.

FIG. 11 shows the configuration of the conventional step-down switching power supply, and is a block diagram obtained by simplifying the step-down switching power supply shown in FIG. 1 of the Japanese Utility Model Publication No. Hei 8-11055. However, for convenience in description, the names and numerals of the components shown in FIG. 1 of the Japanese Utility Model Publication No. Hei 8-11055 are changed in the step-down switching power supply shown in FIG. 11. In FIG. 11, numeral 101 designates an input power supply, and the input power supply 101 outputs an input DC voltage Vi to a converter section 102. The converter section 102 comprises a switch 111, an inductor 112, a rectifier 113 and an output capacitor 114. Furthermore, the converter section 102 is driven and controlled by a control section 115 and supplies a power to a load 103.

In the converter section 102, one terminal of the switch 111 is connected to the input power supply 101. The switch 111 is turned ON or OFF by a drive signal V111 output from the control section 115. The other terminal of the switch 111 is connected to one terminal of the inductor 112 and the output terminal of the rectifier 113. The other terminal of the inductor 112 is connected to the output capacitor 114. An output DC voltage Vo is supplied from the output capacitor 114 to the load 103. When the switch 111 is ON, current flows from the input power supply 101 through the switch 111 and the inductor 112 to the output capacitor 114 and the load 103, returning to the input power supply 101. Hence, magnetic energy is stored in the inductor 112, and a power is supplied to the load 103. When the switch 111 is OFF, current flows from the rectifier 113 through the inductor 112 to the output capacitor 114 and the load 103, returning to the rectifier 113. Hence, the magnetic energy of the inductor 112 is released, and a power is supplied to the load 103.

A stable power is thus supplied to the load 103 by the periodic repetition of the above-mentioned ON/OFF operation of the switch 111. When it is assumed that the ratio of the ON time in one switching cycle of the switch 111 is duty ratio δ, the relationship between the input DC voltage Vi and the output DC voltage Vo is represented by the following expression (1).

$$Vo = \delta \cdot Vi \qquad (1)$$

Therefore, the output DC voltage Vo can be controlled by adjusting the duty ratio δ of the switch 111. In the expression (1), it is assumed that the voltage drop at the time when each of the components, such as the switch 111, is ON is negligible.

In FIG. 11, the control section 115 comprises a detection circuit 116, an oscillation circuit 117, a transient response adjustment circuit 118, an adder 119 and a pulse-width modulation circuit 120. The detection circuit 116 detects the output DC voltage Vo and outputs a control signal Ve corresponding to the output DC voltage Vo. The control signal Ve lowers as the output DC voltage Vo is higher than its target value. Conversely, the control signal Ve rises as the output DC voltage Vo is lower than its target value. The oscillation circuit 117 outputs a triangular wave signal Vt that increases/decreases at a predetermined frequency. The transient response adjustment circuit 118 detects the output current Io of the converter section 102, compares the output current Io with an output setting current Iset, and outputs a correction signal Va. The correction signal Va is added to the control signal Ve at the adder 119, and the resulting signal is input to the pulse-width modulation circuit 120. The pulse-width modulation circuit 120 compares the sum signal (Ve+Va) of the control signal Ve and the correction signal Va with the triangular wave signal Vt, and outputs the drive signal V111. When the sum signal (Ve+Va) is higher than the triangular wave signal Vt, the drive signal V111 becomes H level, thereby turning ON the switch 111. When the sum signal (Ve+Va) is lower than the triangular wave signal Vt, the drive signal V111 becomes L level, thereby turning OFF the switch 111.

A configuration wherein the transient response adjustment circuit 118 and the adder 119 are eliminated from the step-down switching power supply configured as described above so that the control signal Ve is directly input to the pulse-width modulation circuit 120 is taken as a conventional example in Japanese Utility Model Publication No. Hei 8-11055. The control system being used in this conventional example is a general control system referred to as the voltage mode control system. Even in the circuit configuration shown in FIG. 11, during ordinary operation wherein the transient response adjustment circuit 118 does not operate, that is, in the case of Va=0, the operation of the circuit configuration is the operation conforming to the conventional voltage mode control system being used generally.

FIG. 12 is a waveform diagram showing the operations of the various sections of the control section 115. In FIG. 12, (a) shows the control signal Ve, (b) shows the correction signal Va, (c) shows the triangular wave signal Vt and the sum signal (Ve+Va), and (d) shows the drive signal V111. The operation states in the left half portion of the waveform diagram of FIG. 12, that is, the operation states up to time t5, correspond to the ordinary operation wherein the transient response adjustment circuit 118 does not operate, that is, the correction signal Va is zero. At time t0, the triangular wave signal Vt begins to lower. At this time, the triangular wave signal Vt is higher than the control signal Ve, the drive signal V111 is L level, and the switch 111 is OFF. When the triangular wave signal Vt becomes lower than the control signal Ve at time t1, the drive signal V111 becomes H level, and the switch 111 is turned ON. The triangular wave signal Vt stops lowering and begins to rise at time t2. When the triangular wave signal Vt becomes higher than the control signal Ve at time t3, the drive signal V111 becomes L level, and the switch 111 is turned OFF. At time t4, the triangular wave signal Vt stops rising and begins to lower. After time t4, an operation similar to that carried out after time to is repeated. When the output DC voltage Vo becomes higher than its target value, the control signal Ve lowers, and the period during which the control signal Ve is higher than the triangular wave signal Vt is shortened. In other words, the ON time during which the drive signal V111 is H level and the switch 111 is ON is shortened. As a result, the output DC voltage Vo having been higher than its target value lowers.

Conversely, when the output DC voltage Vo becomes lower than its target value, the control signal Ve rises, and the ON time is lengthened. As a result, the output DC voltage Vo having been lower than its target value rises. In this way, the output DC voltage Vo is stabilized to its target value.

Next, it is assumed that the load 103 becomes heavy abruptly and the output current Io increases abruptly at time t5. The detection circuit 116 detects the drop of the output DC voltage Vo owing to the abrupt increase of the load, and the control signal Ve rises. On the other hand, the transient response adjustment circuit 118, being used to detect the output current Io, detects the abrupt increase of the load earlier than the detection circuit 116, and raises the correction signal Va before the control signal Ve rises. Since the pulse-width modulation circuit 120 compares the sum signal (Ve+Va) of the control signal Ve and the correction signal Va with the triangular wave signal Vt, the H level period of the drive signal V111, that is, the ON time of the switch 111, is lengthened instantaneously.

The conventional step-down switching power supply configured as described above is capable of preventing the output DC voltage Vo from lowering by instantaneously responding to abrupt increase in load.

As described above, in an electronic device, for the purpose of supplying power supply voltages best suited for respective multiple load circuits, switching power supplies generating different power supply voltages are required to be provided in parallel. However, in the case that the multiple conventional switching power supplies described above are provided in parallel to output powers controlled individually as described above to the respective load circuits, the size of the circuit becomes large, thereby causing a problem of making the device large. When the respective switching power supplies carry out switching operation at the frequencies of the oscillation circuits respectively incorporated therein, there is a problem of generating abnormal noise or increasing an output ripple voltage owing to a low-frequency beat phenomenon caused by adjacent switching frequencies. Furthermore, the generation of multiple noise spectra owing to the multiple switching frequencies causes other devices and circuits to malfunction, and causes a problem of making countermeasures against noise difficult. Moreover, although the conventional switching power supply configured as described above can respond to abrupt changes in load by detecting the output current and by adding the transient response adjustment circuit, the conventional switching power supply has a problem of being unable to respond to changes in the output DC voltage.

BRIEF SUMMARY OF THE INVENTION

The present invention is intended to provide a multi-output power supply having multiple switching power supplies provided in parallel, being capable of responding to loads having changing output specifications by using switching power supplies having quick responsiveness and capable of being controlled suitably without causing any beat phenomenon so as to make countermeasures against noise easy by operating the respective power supplies in synchronization with a single switching frequency, and to provide an electronic device incorporating the multi-output power supply.

For the purpose of attaining the above-mentioned object, a multi-output power supply in accordance with a first aspect of the present invention comprises:

an input power supply, a first converter section having a first switch, a first inductor and a first rectifier, to which a power is supplied from the input power supply and from which a first output voltage is output, a first detection circuit for outputting a first control signal corresponding to the first output voltage, a first oscillation circuit for outputting a first triangular wave signal having a predetermined frequency and a clock signal synchronized with the first triangular wave signal, a first pulse-width modulation circuit for outputting a first drive signal for turning ON or OFF the first switch by comparing at least the first control signal with the first triangular wave signal, a second converter section having a second switch, a second inductor and a second rectifier, to which a power is supplied from the input power supply and from which a second output voltage is output, a second detection circuit for outputting a second control signal corresponding to the second output voltage, a second oscillation circuit for outputting a second triangular wave signal synchronized with the clock signal, a current detection circuit for outputting a current signal corresponding to the current flowing in the second inductor, and a second pulse-width modulation circuit for generating and outputting a second drive signal for turning ON the second switch depending on the clock signal and for turning OFF the second switch depending on at least the signal obtained by comparing the second control signal with the current signal.

A multi-output power supply in accordance with a second aspect of the present invention is a multi-output power supply in accordance with the first aspect, being configured that the first pulse-width modulation circuit turns ON the first switch depending on the signal obtained by comparing the first control signal with the first triangular wave signal and turns OFF the first switch depending on the clock signal.

A multi-output power supply in accordance with a third aspect of the present invention is a multi-output power supply in accordance with the first aspect, being configured that the second pulse-width modulation circuit generates and outputs the second drive signal for turning OFF the second switch depending on the signal obtained by comparing the signal obtained by subtracting the second triangular wave signal from the second-control signal with the current signal.

A multi-output power supply in accordance with a fourth aspect of the present invention is a multi-output power supply in accordance with the first aspect, being configured that the second pulse-width modulation circuit generates and outputs the second drive signal for turning OFF the second switch depending on the signal obtained by comparing the signal obtained by adding the second triangular wave signal to the current signal with the second control signal.

A multi-output power supply in accordance with a fifth aspect of the present invention comprises:

an input power supply, a first converter section having a first switch, a first inductor and a first rectifier, to which a power is supplied from the input power supply and from which a first output voltage is output, a first detection circuit for outputting a first control signal corresponding to the first output voltage, an oscillation circuit for outputting a first triangular wave signal having a predetermined frequency, a second triangular wave signal synchronized with the first triangular wave signal and a clock signal synchronized with the first triangular wave signal, a first pulse-width modulation circuit for outputting a first drive signal for turning ON or OFF the first switch by comparing the first control signal with the first triangular wave signal, a second converter section having a second switch, a second inductor and a second rectifier, to which a power is supplied from the input power supply and from which a second output voltage is output, a second detection circuit for outputting a second control signal corresponding to the second output voltage, a current detection circuit for outputting a current signal corresponding to the current flowing in the second inductor, and a second pulse-width modulation circuit for generating and outputting a second drive signal for turning ON the second switch depending on the clock signal and for turning OFF the second switch depending on the signal obtained by calculating or comparing the second control signal, the second triangular wave signal and the current signal.

A multi-output power supply in accordance with a sixth aspect of the present invention is a multi-output power supply in accordance with the fifth aspect, being configured that the first pulse-width modulation circuit turns ON the first switch depending on the signal obtained by comparing the first control signal with the first triangular wave signal and turns OFF the first switch depending on the clock signal.

A multi-output power supply in accordance with a seventh aspect of the present invention is a multi-output power supply in accordance with the fifth aspect, being configured that the oscillation circuit generates the second triangular wave signal on the basis of the difference between a predetermined reference value and the first triangular wave signal.

A multi-output power supply in accordance with an eighth aspect of the present invention is a multi-output power supply in accordance with the fifth aspect, being configured that the second pulse-width modulation circuit outputs the second drive signal for turning OFF the second switch by comparing the signal obtained by subtracting the second triangular wave signal from the second control signal with the current signal to carry out slope compensation.

A multi-output power supply in accordance with a ninth aspect of the present invention is a multi-output power supply in accordance with the fifth aspect, being configured that the second pulse-width modulation circuit generates and outputs the second drive signal for turning OFF the second switch depending on the signal obtained by comparing the signal obtained by adding the second triangular wave signal to the current signal with the second control signal.

An electronic device in accordance with a tenth aspect of the present invention comprises a multi-output power supply in accordance with the first or fifth aspect and an electronic circuit having multiple operation modes requiring different operation currents, being configured that the second output voltage output from the second converter section of the multi-output power supply is supplied to the electronic circuit.

The present invention can provide a multi-output power supply being small, easy to control and capable of supplying optimum power supply voltages to respective multiple load circuits. The multi-output power supply in accordance with the present invention can respond to load fluctuations in the load circuits by using the switching power supplies quickly responding to the load fluctuations. Furthermore, the respective switching power supplies for supplying optimum powers to multiple load circuits having different load characteristics can be controlled suitably in synchronization With the multi-output power supply in accordance with the present invention, at least the first converter section conforming to the voltage mode control system and the second converter section conforming to the current mode control system are provided in parallel. Hence, the second converter section conforming to the current mode control system, capable of quickly responding to load fluctuations, can respond to the load fluctuations. In addition, since the second converter section conforming to the current mode control system operates in synchronization with the first converter section conforming to the voltage mode control system, there is no occurrence of a beat phenomenon, and countermeasures against noise can be taken easily.

Furthermore, a ripple current included in the input current from the input power supply can be reduced by synchronizing the timing at which the first switch of the first converter section is turned OFF with the timing at which the second switch of the second converter section is turned ON. For this reason, burdens to the input power supply, such as a battery, can be reduced, and the level of the noise being generated in the input power line can be lowered.

Moreover, with the present invention, in the oscillation circuit, the second triangular wave signal required for the slope compensation of the second converter section conforming to the current mode control system is generated from the first triangular wave signal required for controlling the first converter section conforming to the voltage mode control system. Hence, it is possible to reduce the number of the components of the oscillation circuit, such as a capacitor.

Still further, since the electronic device in accordance with the present invention uses the multi-output power supply producing the above-mentioned excellent effects, the electronic device is compact, highly reliable and versatile, and requires reduced number of components.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the figures are schematic representations for purposes of illustration and do not necessarily depict the actual relative sizes or locations of the elements shown.

DETAILED DESCRIPTION OF THE INVENTION

Preferred embodiments of a multi-output power supply in accordance with the present invention and an electronic device using the same will be described below referring to the accompanying drawings.

<<First Embodiment>>

Figure 1:
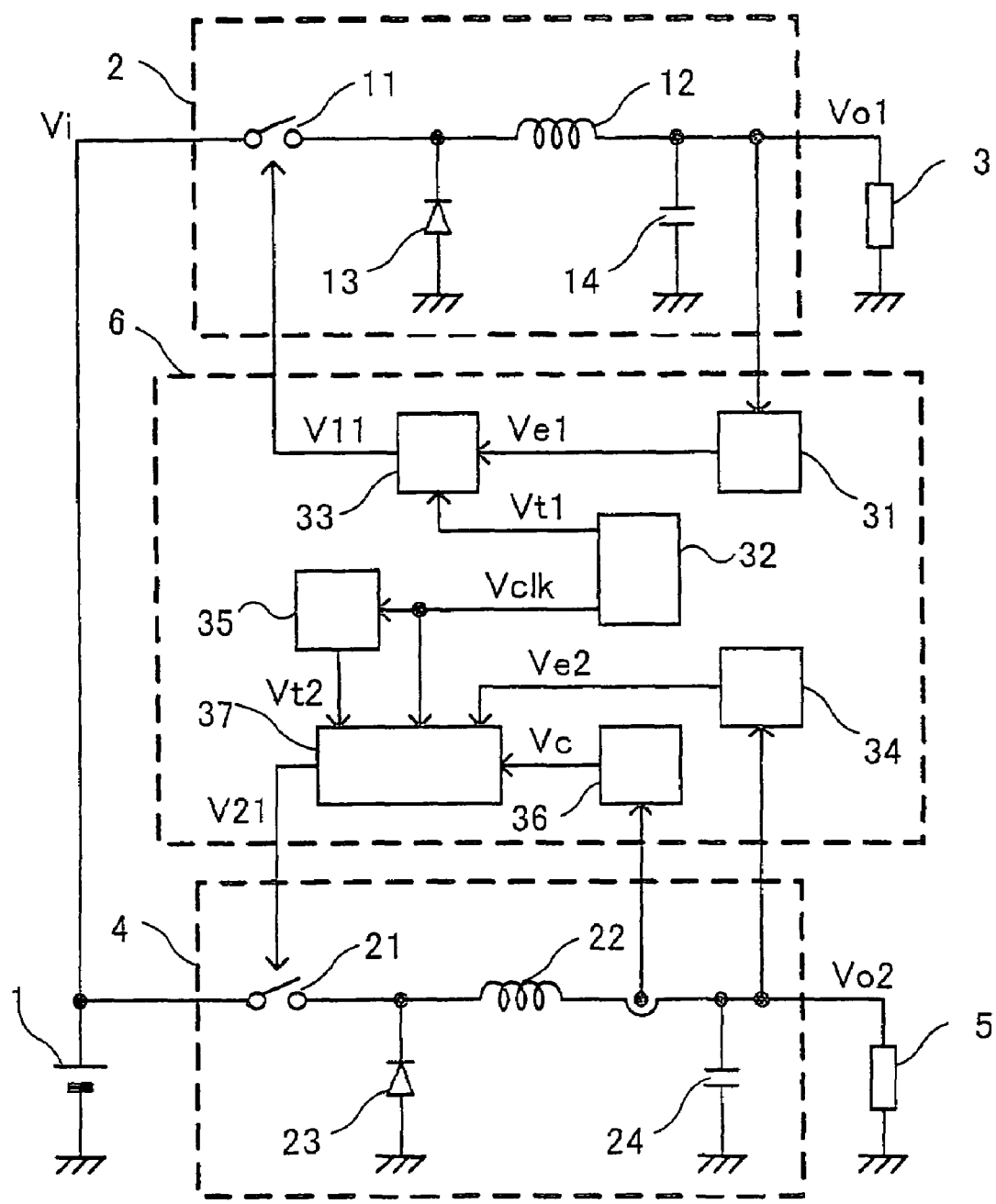
FIG. 1 is a circuit diagram showing the configuration of a multi-output power supply in accordance with a first embodiment of the present invention.
Figure 2:
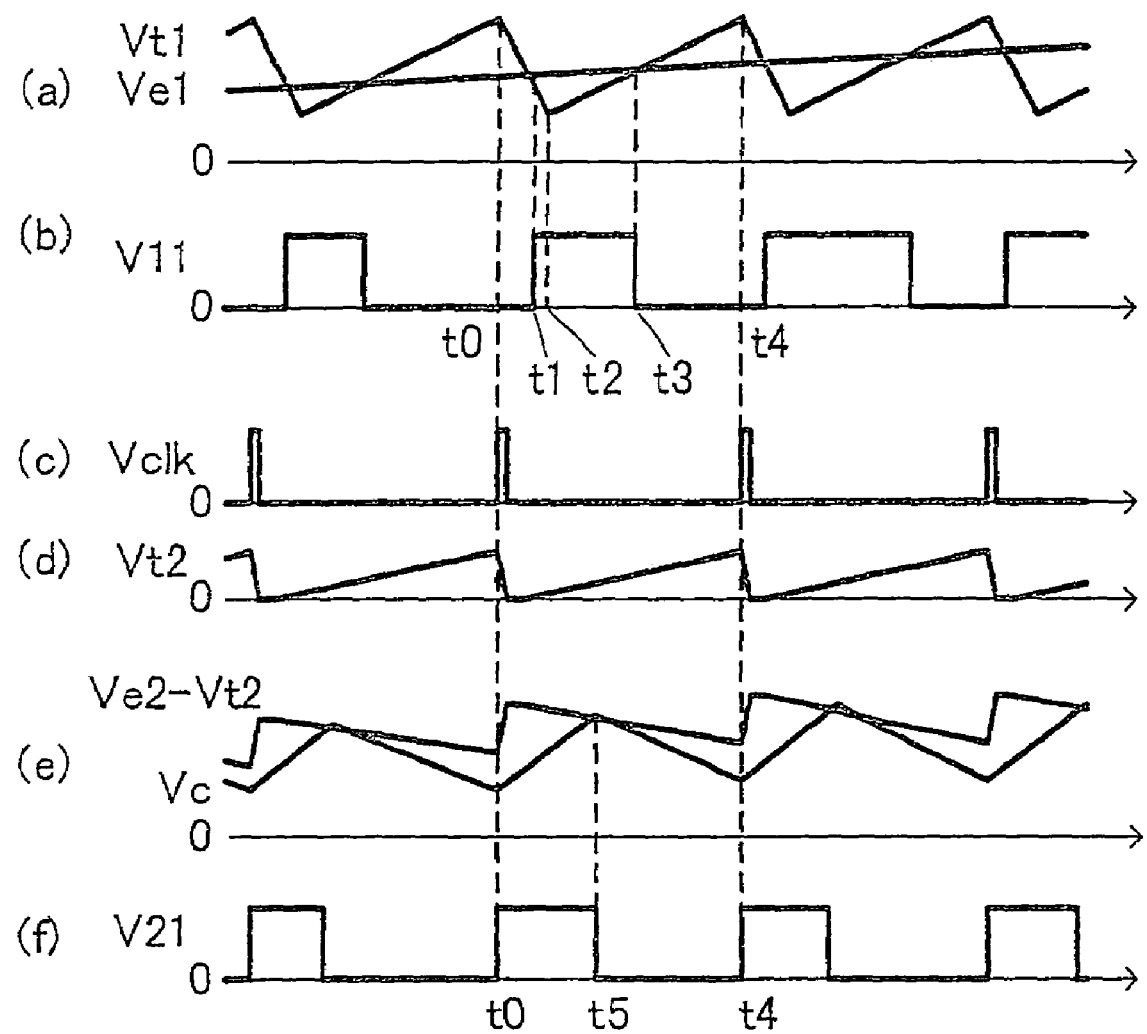
FIG. 2 is a waveform diagram showing the operations of the main sections of the multi-output power supply in accordance with the first embodiment of the present invention.

FIG. 1 is a circuit diagram showing the configuration of a multi-output power supply in accordance with a first embodiment of the present invention, and FIG. 2 is a waveform diagram showing the operations of the main sections of the multi-output power supply in accordance with the first embodiment. The multi-output power supply in accordance with the first embodiment is configured so as to be provided with two step-down switching power supplies to supply desired powers to two loads.

In FIG. 1, an input power supply 1 outputs an input DC voltage Vi to two step-down switching power supplies. A first converter section 2 serving as one of the step-down switching power supplies comprises a first switch 11, a first inductor 12, a first rectifier 13 and a first output capacitor 14. The input DC voltage Vi is input to the first converter section 2, and the first converter section 2 supplies a first output DC voltage Vo1 to a first load 3. A second converter section 4 serving as the other step-down switching power supply comprises a second switch 21, a second inductor 22, a second rectifier 23 and a second output capacitor 24. The input DC voltage Vi is input to the second converter section 4, and the second converter section 4 supplies a second output DC voltage Vo2 to a second load 5. A control section 6 detects the first output DC voltage Vo1 and the second output DC voltage Vo2, and outputs a drive signal V11 for turning ON/OFF the first switch 11 and a drive signal V21 for turning ON/OFF the second switch 21.

In the first converter section 2 shown in FIG. 1, one terminal of the first switch 11 is connected to the input power supply 1, and the other terminal of the first switch 11 is connected to one terminal of the first inductor 12 and the output terminal of the first rectifier 13. The other terminal of the first inductor 12 is connected to the first output capacitor 14. The first output DC voltage Vo1 is supplied from the first output capacitor 14 to the first load 3. When the first switch 11 is ON, current flows from the input power supply 1 through the first switch 11 and the first inductor 12 to the first output capacitor 14 and the first load 3, returning to the input power supply 1. Hence, magnetic energy is stored in the first inductor 12, and a power is supplied to the first load 3. When the first switch 11 is OFF, current flows from the first rectifier 13 through the first inductor 12 to the first output capacitor 14 and the first load 3, returning to the first rectifier 13. Hence, the magnetic energy of the first inductor 12 is released, and a power is supplied to the first load 3. A stable power is thus supplied to the first load 3 by the periodic repetition of the above-mentioned ON/OFF operation of the first switch 11. When it is assumed that the ratio of the ON time in one switching cycle of the first switch 11 is duty ratio δ1, the relationship between the input DC voltage Vi and the first output DC voltage Vo1 is represented by the following expression (2).

$$Vo1 = \delta1 \cdot Vi \quad (2)$$

Therefore, the first output DC voltage Vo1 can be controlled by adjusting the duty ratio δ1 of the first switch 11. In the expression (2), it is assumed that the voltage drop at the time when each of the components, such as the first switch 11, is ON is negligible.

Similarly, in the second converter section 4 shown in FIG. 1, one terminal of the second switch 21 is connected to the input power supply 1, and the other terminal of the second switch 21 is connected to one terminal of the second inductor 22 and the output terminal of the second rectifier 23. The other terminal of the second inductor 22 is connected to the second output capacitor 24. The second output DC voltage Vo2 is supplied from the second output capacitor 24 to the second load 5. As in the first converter section 2, a stable power is supplied to the second load 5 by the periodic repetition of the ON/OFF operation of the second switch 21. When it is assumed that the ratio of the ON time in one switching cycle of the second switch 21 is duty ratio δ2, the relationship between the input DC voltage Vi and the second output DC voltage Vo2 is represented by the following expression (3).

$$Vo2 = \delta2 \cdot Vi \quad (3)$$

Therefore, the second output DC voltage Vo2 can be controlled by adjusting the duty ratio δ2 of the second switch 21. In the expression (3), it is assumed that the voltage drop at the time when each of the components, such as the second switch 21, is ON is negligible.

Next, referring to FIGS. 1 and 2, a stabilization method carried out by the control section 6 will be described below, wherein the control section 6 adjusts the pulse width of the drive signal V11 supplied to the first switch 11 and the pulse width of the drive signal V21 supplied to the second switch 11 so that the first output DC voltage Vo1 and the second output DC voltage Vo2 have their respective target values.

In FIG. 1, the control section 6 comprises a first detection circuit 31, a first oscillation circuit 32 and a first pulse-width modulation circuit 33 for the first converter section 2, and further comprises a second detection circuit 34, a second oscillation circuit 35, a current detection circuit 36 and a second pulse-width modulation circuit 37 for the second converter section 4.

The first detection circuit 31 detects the first output DC voltage Vo1 and outputs a first control signal Ve1 corresponding to the detected first output DC voltage Vo1. The first control signal Ve1 lowers as the first output DC voltage Vo1 is higher than its target value. Conversely, the first control signal Ve1 rises as the first output DC voltage Vo1 is lower than its target value. The first oscillation circuit 32 outputs a first triangular wave signal Vt1 that increases/decreases at a predetermined frequency and a clock signal Vclk synchronized with the first triangular wave signal Vt1. The first pulse-width modulation circuit 33 compares the first control signal Ve1 with the first triangular wave signal Vt1, and outputs a first drive signal V11. When the first control signal Ve1 is higher than the first triangular wave signal Vt1, the first drive signal V11 becomes H level, thereby turning ON the first switch 11. On the other hand, when the first control signal Ve1 is lower than the first triangular wave signal Vt1, the first drive signal V11 becomes L level, thereby turning OFF the first switch 11. In other words, the first detection circuit 31, the first oscillation circuit 32 and the first pulse-width modulation circuit 33 control the first converter section 2 on the basis of the voltage mode control system.

The second detection circuit 34 detects the second output DC voltage Vo2 and outputs a second control signal Ve2 corresponding to the detected second output DC voltage Vo2. The second control signal Ve2 lowers as the second output DC voltage Vo2 is higher than its target value. Conversely, the second control signal Ve2 rises as the second output DC voltage Vo2 is lower than its target value. The second oscillation circuit 35 outputs a second triangular wave signal Vt2 synchronized with the clock signal Vclk. The current detection circuit 36 detects the current flowing in the second inductor 22 and outputs a current signal Vc. The second pulse-width modulation circuit 37 sets the second drive signal V21 to H level in synchronization with the clock signal Vclk, thereby turning ON the second switch 21. Furthermore, when the current signal Vc reaches a calculation signal (Ve2−Vt2) obtained by subtracting the second triangular wave signal Vt2 from the second control signal Ve2, the second pulse-width modulation circuit 37 sets the second drive signal V21 to L level, thereby turning OFF the second switch 21. In other words, the second detection circuit 34, the second oscillation circuit 35, the current detection circuit 36 and the second pulse-width modulation circuit 37 control the second converter section 4 on the basis of the current mode control system.

FIG. 2 is a waveform diagram showing the operations of the various sections in the control section 6. In FIG. 2, (a) shows the first triangular wave signal Vt1 and the first control signal Ve1, (b) shows the first drive signal V11, (c) shows the clock signal Vclk, (d) shows the second triangular wave signal Vt2, (e) shows the calculation signal (Ve2−Vt2) relating to the second control signal Ve2 and the second triangular wave signal Vt2, and (f) shows the second drive signal V21.

First, a method for stabilizing the first output DC voltage Vo1 to its target value by adjusting the pulse width of the drive signal V11 supplied to the first switch 11 will be described below.

As shown in FIG. 2, at time t0, the first triangular wave signal Vt1 begins to lower. At this time, the first triangular wave signal Vt1 is higher than the first control signal Ve1, the first drive signal V11 is L level, and the first switch 11 is OFF. When the first triangular wave signal Vt1 reaches the first control signal Ve1 and becomes lower than the first control signal Ve1 at time t1, the first drive signal V11 becomes H level, and the first switch 11 is turned ON. At time t2, the first triangular wave signal Vt1 stops lowering and begins to rise. When the first triangular wave signal Vt1 reaches the first control signal Ve1 at time t3 and becomes higher than the first control signal Ve1, the first drive signal V11 becomes L level, and the first switch 11 is turned OFF. At time t4, the first triangular wave signal Vt1 stops rising and begins to lower. After time t4, an operation similar to that carried out after time t0 is repeated.

When the first output DC voltage Vo1 becomes higher than its target value, the first control signal Ve1 lowers, and the period during which the first control signal Ve1 is higher than the first triangular wave signal Vt1 is shortened. In other words, the ON time during which the first drive signal V11 is H level and the first switch 11 is ON is shortened. As a result, the first output DC voltage Vo1 having been higher than its target value lowers.

Conversely, when the first output DC voltage Vo1 becomes lower than its target value, the first control signal Ve1 rises, and the period during which the first control signal Ve1 is higher than the first triangular wave signal Vt1 is lengthened. Hence, the ON time of the first switch 11 is lengthened, and the first output DC voltage Vo1 having been lower than its target value rises.

As described above, the first output DC voltage Vo1 is stabilized to its target value by adjusting the pulse width of the first drive signal V11 supplied to the first switch 11.

Next, a method for adjusting the pulse width of the second drive signal V21 supplied to the second switch 21 to stabilize the second output DC voltage Vo2 to its target value will be described below.

At time t0 when the first triangular wave signal Vt1 stops rising and begins to lower, the clock signal Vclk, a one-shot pulse, rises. At this time, the second triangular wave signal Vt2 abruptly lowers to zero and begins to rise. In accordance with this, the calculation signal (Ve2−Vt2) obtained by subtracting the second triangular wave signal Vt2 from the second control signal Ve2 also rises abruptly and then begins to lower. At this time, the second drive signal V21 becomes H level, and the second switch 21 is turned ON. Since the second switch 21 is ON, the current flowing in the second inductor 22 increases, and the current signal Vc rises. When the current signal Vc becomes higher than the calculation signal (Ve2−Vt2) relating to the second triangular wave signal Vt2 and the second control signal Ve2 at time t5, the second drive signal V21 becomes L level, thereby turning OFF the second switch 21. After the second switch 21 is turned OFF and as the current flowing in the second inductor 22 decreases, the current signal Vc lowers. At time t4, the clock signal Vclk rises again, and at the same time, the second triangular wave signal Vt2 abruptly lowers to zero and begins to rise. After time t4, an operation similar to that carried out after time t0 is repeated.

When the second output DC voltage Vo2 becomes higher than its target value, the second control signal Ve2 lowers, and the period until the current signal Vc reaches the calculation signal (Ve2−Vt2) relating to the second triangular wave signal Vt2 and the second control signal Ve2 is shortened. In other words, the ON time during which the second drive signal V21 is H level and the second switch 21 is ON is shortened. As a result, the second output DC voltage Vo2 having been higher than its target value lowers.

Conversely, when the second output DC voltage Vo2 becomes lower than its target value, the second control signal Ve2 rises, and the period until the current signal Vc reaches the calculation signal (Ve2−Vt2) relating to the second control signal Ve2 and the second triangular wave signal Vt2 is lengthened. Hence, the ON time of the second switch 21 is lengthened, and the second output DC voltage Vo2 having been lower than its target value rises.

As described above, the second output DC voltage Vo2 is stabilized to its target value by adjusting the pulse width of the second drive signal V21 supplied to the second switch 21.

In the case that the duty ratio in a switching power supply having a fixed switching frequency and conforming to the current mode control system is 0.5 or more, it is known that an unstable operation phenomenon referred to as subharmonic oscillation occurs. A technology referred to as slope compensation is used to take countermeasures against this phenomenon. In the multi-output power supply in accordance with the first embodiment, slope compensation wherein the second triangular wave signal (−Vt2) is superimposed on the second control signal Ve2 and compared with the current signal Vc is carried out, thereby preventing subharmonic oscillation.

The step-down switching power supply configured as described above to output desired voltages to the respective loads (3 and 5) has a configuration wherein the voltages converted by the switches (11 and 21) into rectangular waves are averaged by the LC filters comprising the inductors (12 and 22) and the output capacitors (14 and 24) and then output. Since the first converter section 2 conforming to the voltage mode control system controls the waveform of the voltage applied to the LC filter, its input-output transmission characteristic is significantly affected by the LC filter. In other words, the alternating current transmission gain has a peak value at the LC resonance frequency. The gain lowers abruptly as the frequency becomes higher, and the phase of the output delays 180 degrees. For the purpose of stabilizing the first output DC voltage Vo1, the first detection circuit 31 must correct the characteristic, or its response frequency must be made sufficiently lower than the LC resonance frequency. On the other hand, since the second converter section 4 conforming to the current mode control system directly controls the inductor current, the second inductor 22 operates equivalently as a current source, and the influence of the LC filter is eliminated. In other words, in the current mode control system, the second detection circuit 34 for stabilizing the second output DC voltage Vo2 can be designed easily, and response performance higher than that in the voltage mode control system can be obtained.

On the other hand, the first converter section 2 conforming to the voltage mode control system has the following advantages. Unlike the case that overcurrent is detected in the voltage mode control system, inductor current is required to be detected in the whole load region in the current mode control system. For this reason, a loss in the case that current detection is carried out using a resistor becomes larger than that in the voltage mode control system. A method for detecting the current flowing in the second switch 21 is available to reduce such a current detection loss. However, in the case that the current flowing in the second switch 21 is detected, the influence of the surge current occurring when the second switch 21 turns ON is required to be avoided. Furthermore, since the current mode control system is based on the premise that current flows in the second inductor 22 at all times, the second switch 21 requires a minimum ON time. On the other hand, in the case of the voltage mode control system, there is no loss due to current direction as a matter of course, and the ON time of the first switch 11 can be controlled to zero in theory.

As described above, the voltage mode control system and the current mode control system have advantages and disadvantages. It is thus preferable that powers should be supplied using a suitable control system, that is, either of the two control systems, depending on load specifications. The current mode control system should be used for a load requiring quick response, and the voltage mode control system having a relatively small circuit size should be used for a load not requiring quick response.

In the multi-output power supply in accordance with the first embodiment of the present invention, the first converter section 2 conforming to the voltage mode control system and the second converter section 4 conforming to the current mode control system are provided in parallel to respond to the loads having various specifications required. Hence, desired powers can be supplied to the respective loads efficiently. Furthermore, the multi-output power supply in accordance with the first embodiment is configured so that the first converter section 2 and the second converter section 4 operate in synchronization with a single switching frequency. Therefore, there is no occurrence of a beat phenomenon, and countermeasures against noise can be taken easily.

Figure 3:
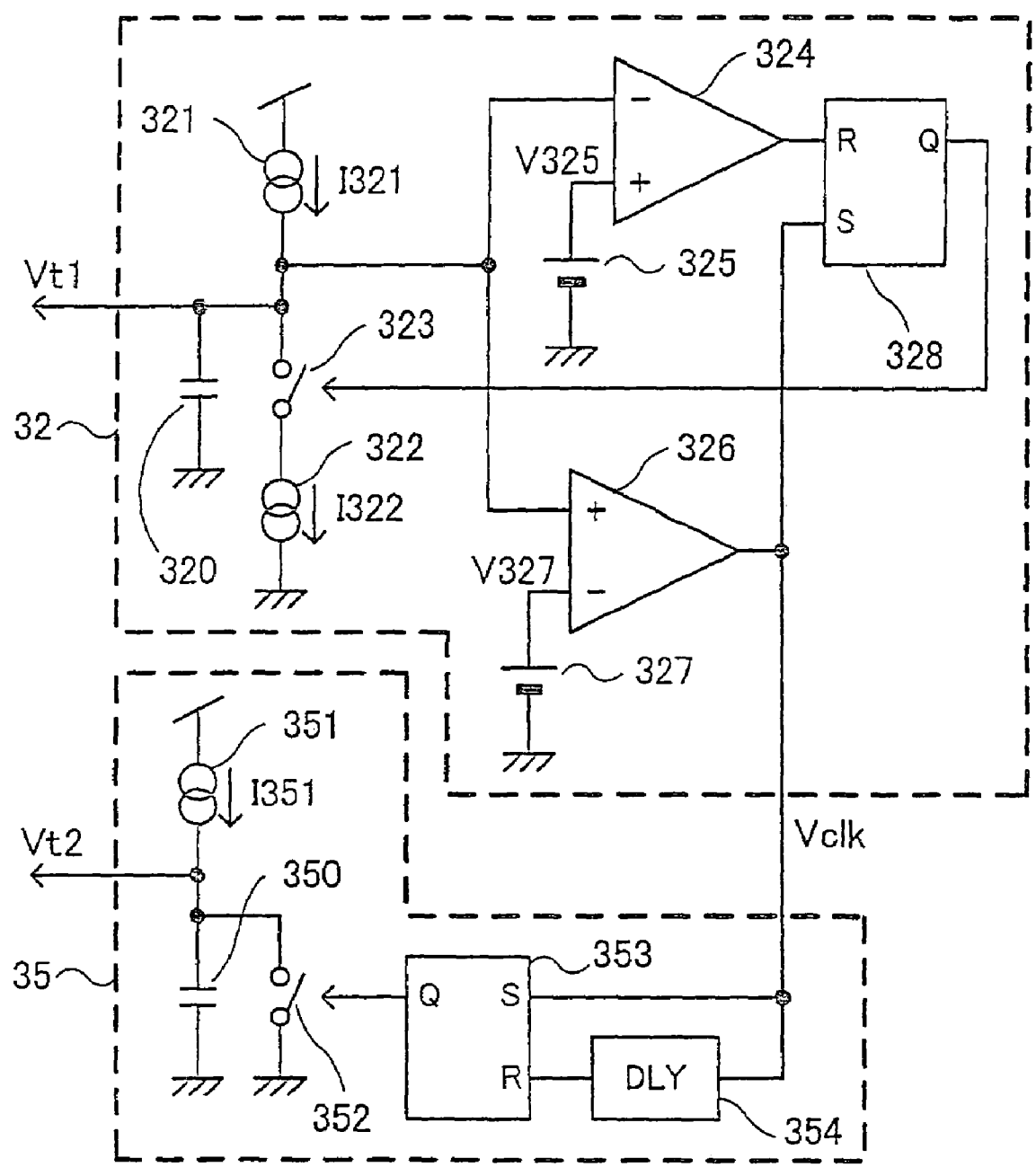
FIG. 3 is a circuit diagram showing the configurations of the first oscillation circuit and the second oscillation circuit of the multi-output power supply in accordance with the first embodiment of the present invention.

FIG. 3 is a diagram showing the detailed circuit configurations of the first oscillation circuit 32 and the second oscillation circuit 35 of the control section 6 in the multi-output power supply in accordance with the first embodiment.

The first oscillation circuit 32 comprises a capacitor 320 for outputting the first triangular wave signal Vt1; a current source 321 for charging the capacitor 320 using a constant current I321; a current source 322 for discharging the capacitor 320 using a constant current I322; a switch 323 connected in series with the current source 322; a comparator 324, to the inverting input terminal of which the voltage of the capacitor 320, that is, the first triangular wave signal Vt1, is applied; a voltage source 325 for applying a voltage V325 to the noninverting input terminal of the comparator 324; a comparator 326, to the noninverting input terminal of which the first triangular wave signal Vt1 is applied; a voltage source 327 for applying a voltage V327 to the inverting input terminal of the comparator 326; and an RS latch 328, to the reset terminal of which the output of the comparator 324 is input, and to the set terminal of which the output of the comparator 326 is input. It is assumed that the constant current I321 is smaller than the constant current I322 (I321<I322) and that the voltage V325 is lower than the voltage V327 (V325<V327). The output of the comparator 326 is the clock signal Vclk, and the clock signal Vclk is input to the RS latch 328 (the set terminal) and the second oscillation circuit 35.

The second oscillation circuit 35 comprises a capacitor 350 for outputting the second triangular wave signal Vt2; a current source 351 for charging the capacitor 350 using a constant current I351; a switch 352 for short-circuiting and discharging the capacitor 350; an RS latch 353, to the set terminal of which the clock signal Vclk is input, and the output of which drives the switch 352; and a delay circuit 354 for delaying the clock signal Vclk by a predetermined time and inputting the delayed clock signal to the reset terminal of the RS latch 353.

First, the operation of the first oscillation circuit 32 will be described below. It is assumed that the output of the RS latch 328 is H level, that the switch 323 is ON, and that the capacitor 320 has been discharged using a constant current (I322-I321). When the voltage of the capacitor 320, that is, the first triangular wave signal Vt1, lowers and eventually becomes lower than the voltage V325, the output of the comparator 324 becomes H level. When the output (H level) of the comparator 324 is input to the reset terminal of the RS latch 328, the output of the RS latch 328 becomes L level, and the switch 323 is turned OFF. Hence, the capacitor 320 is charged using the constant current I321, and the first triangular wave signal Vt1 stops lowering and begins to rise.

When the first triangular wave signal Vt1 rises and eventually becomes higher than the voltage V327, the output of the comparator 326 becomes H level. When the output (H level) of the comparator 326 is input to the set terminal of the RS latch 328, the output of the RS latch 328 becomes H level, and the switch 323 is turned ON. Hence, the capacitor 320 is discharged again using the constant current (I322-I321), and the first triangular wave signal Vt1 begins to lower.

The above-mentioned operation is repeated, and the first triangular wave signal Vt1 periodically increases/decreases between the voltage V325 and the voltage V327. The clock signal Vclk is the output of the comparator 326 and is a one-shot pulse that is H level only when the first triangular wave signal Vt1 is higher than the voltage V327.

Next, the operation of the second oscillation circuit 35 will be described below. The clock signal Vclk is input to the set terminal of the RS latch 353. When the clock signal Vclk becomes H level, the output of the RS latch 353 becomes H level, and the switch 352 is turned ON. The capacitor 350 is short-circuited and discharged by the switch 352, and the voltage of the capacitor 350, that is, the second triangular wave signal Vt2, becomes zero. Next, the clock signal Vclk being H level is input via the delay circuit 354 to the reset terminal of the RS latch 353, and the output of the RS latch 353 becomes L level. The clock signal Vclk is a one-shot pulse as described above, and the delay time of the delay circuit 354 is set so as to be equal to or more than a period during which the capacitor 350 is completely discharged owing to the ON state of the switch 352. When the output of the RS latch 353 becomes L level, the switch 352 is turned OFF, the capacitor 350 is charged using the constant current I351, and the second triangular wave signal Vt2 rises. This rising continues until the clock signal Vclk becomes H level.

The above-mentioned operation is repeated, and the second triangular wave signal Vt2 periodically increases/decreases between the zero potential and the predetermined voltage. The timing of the discharging, at which the second triangular wave signal Vt2 becomes the zero potential, is synchronized with the clock signal Vclk.

As described above, in the multi-output power supply in accordance with the first embodiment of the present invention, the first converter section 2 conforming to the voltage mode control system and the second converter section 4 conforming to the current mode control system are provided in parallel so as to be capable of supplying stable powers to respective loads having different specifications required. Furthermore, since the first converter section 2 and the second converter section 4 operate synchronously, a single switching frequency is used. Therefore, there is no occurrence of a beat phenomenon, and countermeasures against noise can be taken easily.

<<Second Embodiment>>

Figure 4:
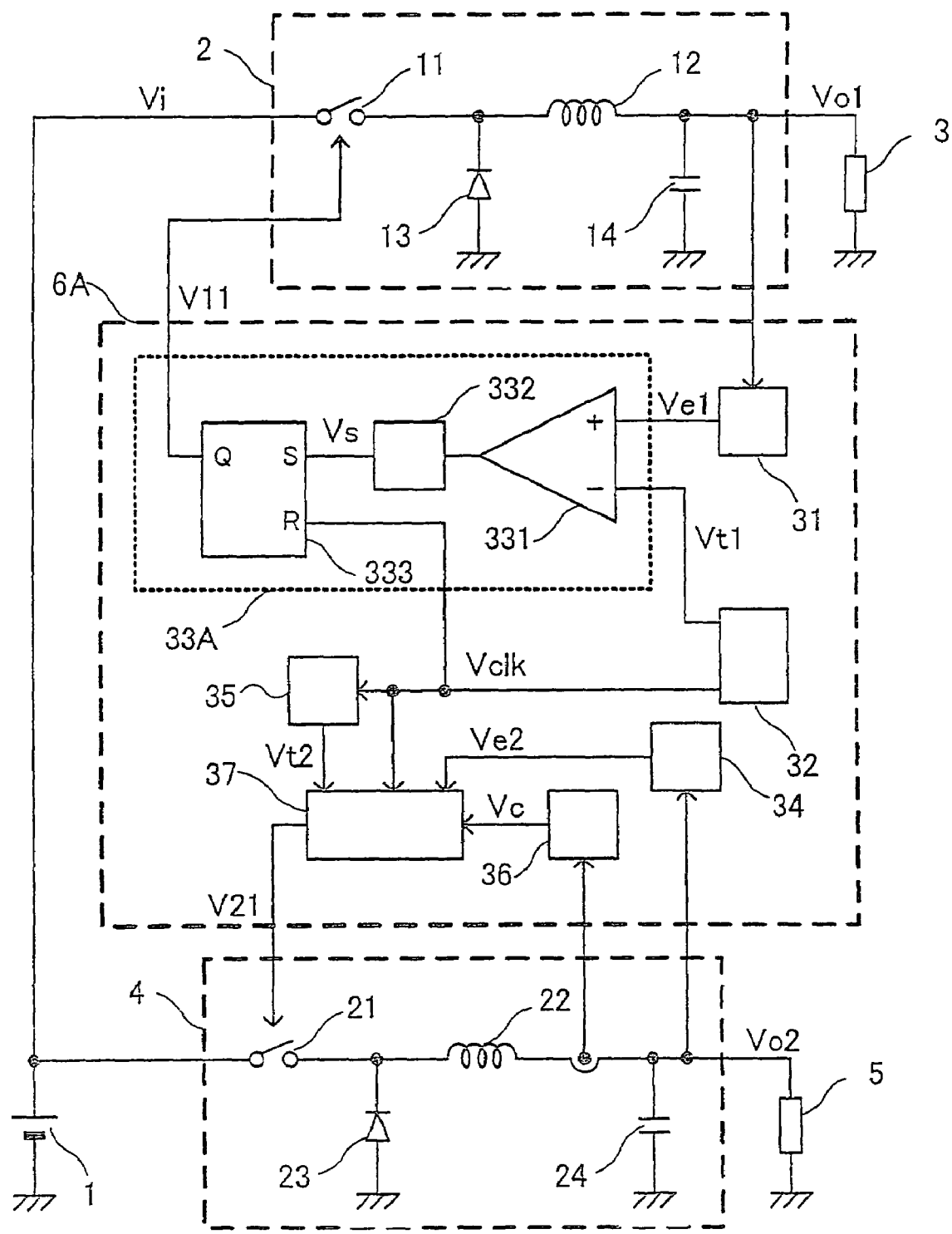
FIG. 4 is a circuit diagram showing the configuration of a multi-output power supply in accordance with a second embodiment of the present invention.
Figure 5:
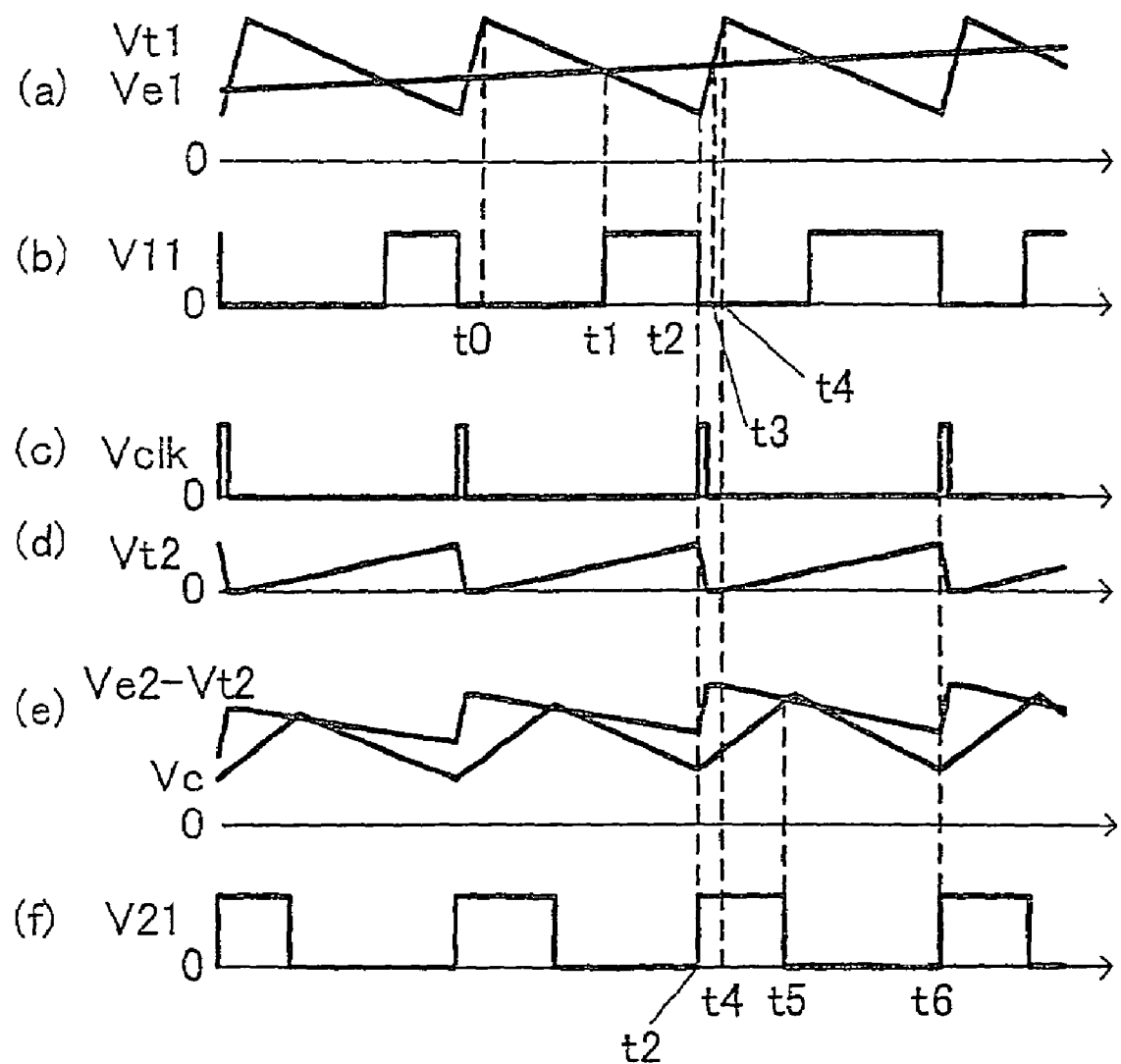
FIG. 5 is a waveform diagram showing the operations of the main sections of the multi-output power supply in accordance with the second embodiment of the present invention.

A multi-output power supply in accordance with a second embodiment of the present invention will be described below referring to the drawings. FIG. 4 is a circuit diagram showing the configuration of the multi-output power supply in accordance with the second embodiment. FIG. 5 is a waveform diagram showing the operations of the main sections in the multi-output power supply in accordance with the second embodiment. In FIG. 4, the same components similar to those of the multi-output power supply in accordance with the first embodiment shown in FIG. 1 described above are designated by the same numerals, and their descriptions are omitted. The multi-output power supply in accordance with the second embodiment differs from that in accordance with the first embodiment in the configuration of the control section. The control section is referred to as "control section 6A" so as to be distinguished from the control section 6 in accordance with the first embodiment. The control section 6A in accordance with the second embodiment differs from the control section 6 in accordance with the first embodiment in the configuration and operation of its first pulse-width modulation circuit. The first pulse-width modulation circuit is referred to as "first pulse-width modulation circuit 33A" so as to be distinguished from the first pulse-width modulation circuit 33 in accordance with the first embodiment.

In FIG. 4, the first pulse-width modulation circuit 33A comprises a comparator 331, an edge detector 332, and an RS latch 333. The first control signal Ve1 is input to the noninverting input terminal of the comparator 331, and the first triangular wave signal Vt1 is input to the inverting input terminal of the comparator 331. The edge detector 332 outputs a one-shot pulse (Vs) at the timing when the output of the comparator 331 is inverted from L level to H level. The RS latch 333 is set by the output Vs of the edge detector 332, reset by the clock signal Vclk and outputs the first drive signal V11.

The operation of the multi-output power supply in accordance with the second embodiment of the present invention will be described below referring to FIGS. 4 and 5.

FIG. 5 is a waveform diagram showing the operations of the various sections in the control section 6A. In FIG. 5, (a) shows the first triangular wave signal Vt1 and the first control signal Ve1, (b) shows the first drive signal V11, (c) shows the clock signal Vclk, (d) shows the second triangular wave signal Vt2, (e) shows the calculation signal (Ve2−Vt2) relating to the second control signal Ve2 and the second triangular wave signal Vt2, and (f) shows the second drive signal V21.

First, an operation for stabilizing the first output DC voltage Vo1 will be described below. At time t0, the first triangular wave signal Vt1 begins to lower. At this time, the first triangular wave signal Vt1 is higher than the first control signal Ve1, the first drive signal V11 is L level, and the first switch 11 is OFF. When the first triangular wave signal Vt1 reaches the first control signal Ve1 and becomes lower than the first control signal Ve1 at time t1, the output of the comparator 331 is inverted from L level to H level, and the edge detector 332 outputs a one-shot pulse. The RS latch 333 is set by the output Vs of the edge detector 332, whereby the output of the RS latch 333, the first drive signal V11, becomes H level and the first switch 11 is turned ON.

At time t2, the first drive signal V11 stops lowering and begins to rise. At the same time, the clock signal Vclk becomes H level. The RS latch 333 is reset by the clock signal Vclk, whereby the output of the RS latch 333, the first drive signal V11, becomes L level, and the first switch 11 is turned OFF. When the first triangular wave signal Vt1 reaches the first control signal Ve1 at time t3 and becomes higher than the first control signal Ve1, the output of the comparator 331 returns to L level. At time t4, the first triangular wave signal Vt1 stops rising and begins to lower. After time t4, an operation similar to that carried out after time t0 is repeated.

When the first output DC voltage Vo1 becomes higher than its target value, the first control signal Ve1 lowers, and the period during which the first control signal Ve1 is higher than the first triangular wave signal Vt1 is shortened. In other words, the ON time during which the first drive signal V11 is H level and the first switch 111 is ON is shortened. As a result, the first output DC voltage Vo1 having been higher than its target value lowers. Conversely, when the first output DC voltage Vo1 becomes lower than its target value, the first control signal Ve1 rises, and the period during which the first control signal Ve1 is higher than the first triangular wave signal Vt1 is lengthened. As a result, the ON time of the first switch 11 is lengthened, and the first output DC voltage Vo1 having been lower than its target value rises.

As described above, the first output DC voltage Vo1 is stabilized to its target value by adjusting the pulse width of the first drive signal V11 supplied to the first switch 11.

Next, an operation for stabilizing the second output DC voltage Vo2 will be described below. When the clock signal Vclk, a one-shot pulse, rises at time t2, the calculation signal (Ve2−Vt2) obtained by subtracting the second triangular wave signal Vt2 from the second control signal Ve2 rises abruptly and then begins to lower. At this time, the second drive signal V21 becomes H level, and the second switch 21 is turned ON. When the current signal Vc that rises as the inductor current increases becomes higher than the calculation signal (Ve2−Vt2) relating to the second triangular wave signal Vt2 and the second control signal Ve2 at time t5 after t4, the second drive signal V21 becomes L level, thereby turning OFF the second switch 21. Since the second switch 21 is turned OFF, the inductor current decreases, and the current signal Vc lowers. At time t6, the clock signal Vclk rises again, and at the same time, the second triangular wave signal Vt2 abruptly lowers to zero and begins to rise. After time t6, an operation similar to that carried out after time t2 is repeated.

When the second output DC voltage Vo2 becomes higher than its target value, the second control signal Ve2 lowers, and the period until the current signal Vc reaches the calculation signal (Ve2−Vt2) relating to the second triangular wave signal Vt2 and the second control signal Ve2 is shortened. In other words, the ON time during which the second drive signal V21 is H level and the second switch 21 is ON is shortened. As a result, the second output DC voltage Vo2 having been higher than its target value lowers. Conversely, when the second output DC voltage Vo2 becomes lower than its target value, the second control signal Ve2 rises, and the period until the current signal Vc reaches the calculation signal (Ve2−Vt2) relating to the second control signal Ve2 and the second triangular wave signal Vt2 is lengthened. As a result, the ON time of the second switch 21 is lengthened, and the second output DC voltage Vo2 having been lower than its target value rises.

As described above, the second output DC voltage Vo2 is stabilized to its target value by adjusting the pulse width of the second drive signal V21 supplied to the second switch 21.

As described above, in the multi-output power supply in accordance with the second embodiment of the present invention, the first converter section 2 conforming to the voltage mode control system and the second converter section 4 conforming to the current mode control system are provided in parallel so as to be capable of supplying stable powers to respective loads having different specifications required. Furthermore, since the first converter section 2 and the second converter section 4 in the multi-output power supply in accordance with the second embodiment operate synchronously, there is no occurrence of a beat phenomenon, and countermeasures against noise can be taken easily. Moreover, the multi-output power supply in accordance with the second embodiment is configured so that the first switch 11 have been turned ON is turned OFF at the rising timing of the clock signal Vclk and the second switch 21 have been turned OFF is turned ON.

In the description of the multi-output power supply in accordance with the first embodiment described above, there occurs a period during which both the first switch 11 and the second switch 21 are ON since the first converter section 2 and the second converter section 4 are operated synchronously. This kind of the overlap of the ON periods of the first switch 11 and the second switch 21 increases a ripple current included in the input current from the input power supply 1, thereby increasing the load applied to the input power supply 1 and generating noise. In the case that the sum of the duty ratio δ1 of the first switch 11 and the duty ratio δ2 of the second switch 21 is larger than 1, the overlap of the ON periods of the first switch 11 and the second switch 21 is inevitable. However, in the multi-output power supply in accordance with the second embodiment of the present invention, the timing at which the first switch 11 is turned OFF is synchronized with the timing at which the second switch 21 is turned ON. Hence, in the case that the sum of the duty ratio δ1 and the duty ratio δ2 is 1 or less, there is no period during which both the first switch 11 and the second switch 21 are ON. In other words, the multi-output power supply in accordance with the second embodiment of the present invention has excellent effects that the load applied to the input power supply 1 can be reduced and that noise being generated in the input power line can be reduced, in addition to the effects of the multi-output power supply in accordance with the first embodiment.

In the description of the second embodiment, it is assumed that the second embodiment is configured such that the first switch 11 is turned OFF and the second switch 21 is turned ON simultaneously at the rising timing of the clock signal Vclk. However, the present invention is not limited to this kind of configuration. For example, the second embodiment may be configured such that the timing at which the second switch 21 is turned ON is delayed from the rising of the clock signal Vclk by a predetermined time to securely eliminate the overlap of the ON periods of the two switches.

The first and second embodiments have been described so as to be configured that, when the current signal Vc is higher than the calculation signal (Ve2−Vt2) obtained by subtracting the second triangular wave signal Vt2 from the second control signal Ve2, the second drive signal V21 becomes L level to carry out slope compensation for preventing subharmonic oscillation. However, a similar effect is also produced by not using this configuration but by using a configuration wherein, when the calculation signal (Vc+Vt2) obtained by adding the second triangular wave signal Vt2 to the current signal Vc is higher than the second control signal Ve2, the second drive signal V21 becomes L level. Furthermore, it may also possible to use a configuration wherein, when the calculation signal (Ve2−Vt2−Vc) obtained by subtracting the second triangular wave signal Vt2 and the current signal Vc from the second control signal Ve2 changes from positive to negative, the second drive signal V21 becomes L level.

<<Third Embodiment>>

Figure 6:
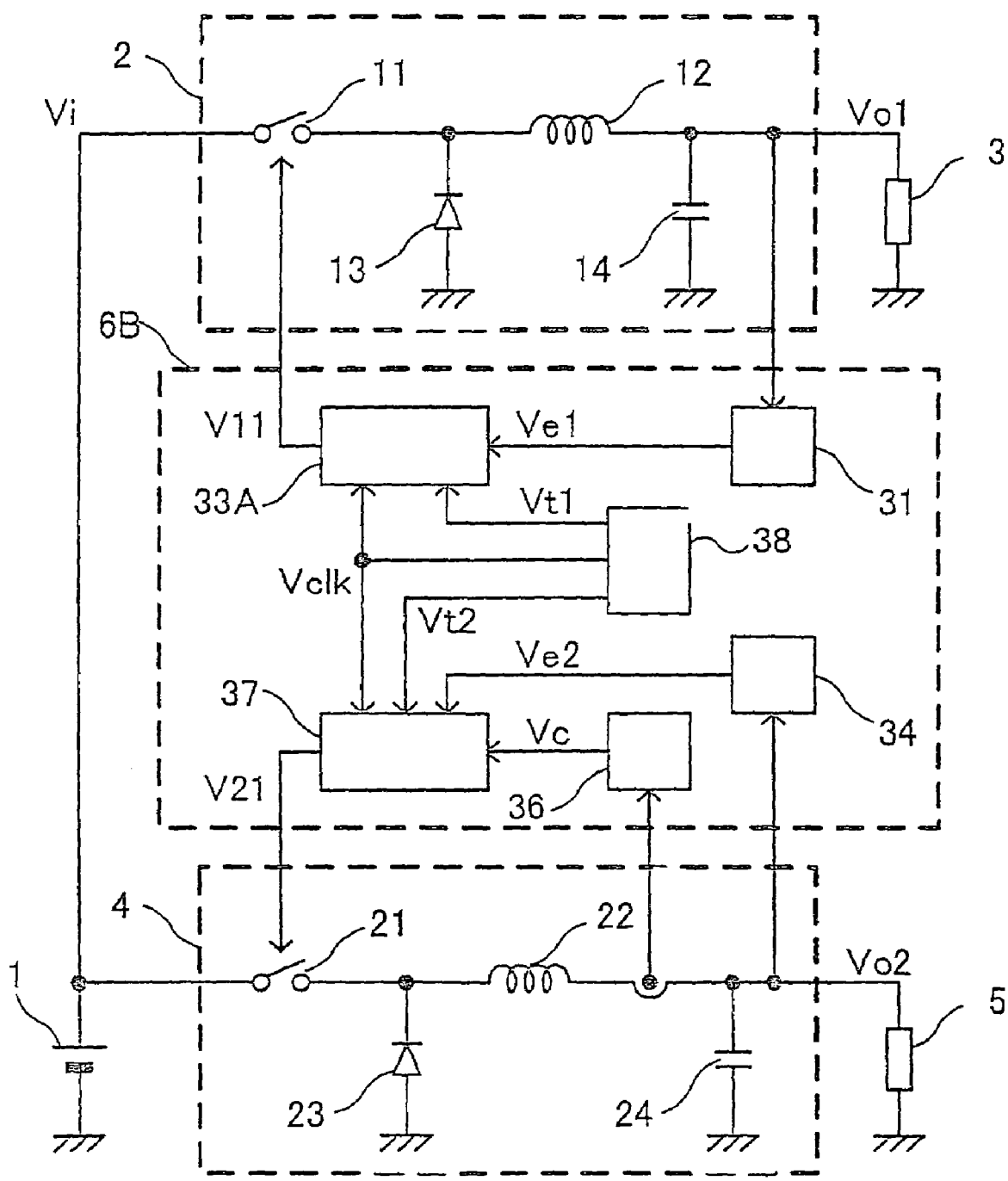
FIG. 6 is a circuit diagram showing the configuration of a multi-output power supply in accordance with a third embodiment of the present invention.

A multi-output power supply in accordance with a third embodiment of the present invention will be described below referring to the drawings. FIG. 6 is a circuit diagram showing the configuration of the multi-output power supply in accordance with the third embodiment. In FIG. 6, the same components similar to those of the multi-output power supply in accordance with the second embodiment shown in FIG. 4 described above are designated by the same numerals, and their descriptions are omitted. The multi-output power supply in accordance with the third embodiment differs from that in accordance with the second embodiment in the configuration of the control section. The control section is referred to as "control section 6B" so as to be distinguished from the control section 6A in accordance with the second embodiment. The control section 6B in accordance with the third embodiment differs from the control section 6A in accordance with the second embodiment in that the first oscillation circuit 32 and the second oscillation circuit 35 are integrated into an oscillation circuit 38. The third embodiment is configured that the oscillation circuit 38 outputs the first triangular wave signal Vt1, the clock signal Vclk and the second triangular wave signal Vt2.

Figure 7:
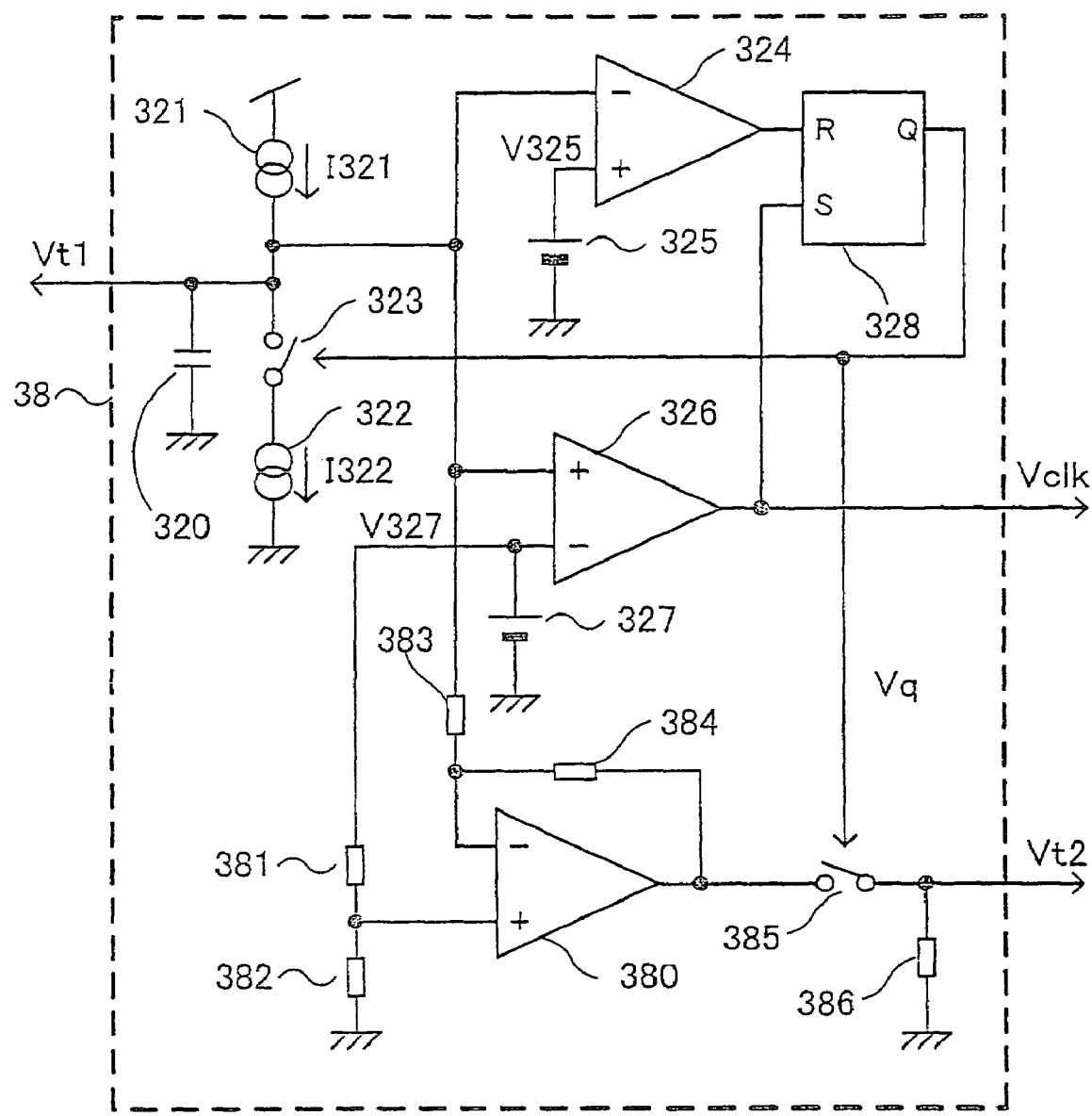
FIG. 7 is a circuit diagram showing the configuration of the oscillation circuit of the multi-output power supply in accordance with the third embodiment of the present invention.

FIG. 7 is a circuit diagram showing the configuration of the oscillation circuit 38. In FIG. 7, the configuration and operation for generating the first triangular wave signal Vt1 and the clock signal Vclk are similar to those of the first oscillation circuit 32 of the multi-output power supply in accordance with the first embodiment and the second embodiment. Hence, their descriptions are omitted. The configuration of the oscillation circuit 38 differs from that of the first oscillation circuit 32 in that an operational amplifier 380, a resistor 381, a resistor 382, a resistor 383, a resistor 384, a switch 385 and a resistor 386 are added in order to output the second triangular wave signal Vt2. The voltage V327 is divided by the resistor 381 and the resistor 382, and the divided voltage is applied to the noninverting input terminal of the operational amplifier 380. The first triangular wave signal Vt1 is applied to the inverting input terminal of the operational amplifier 380 via the resistor 383, and the resistor 384 is connected between the output terminal and the inverting input terminal of the operational amplifier 380. In other words, the operational amplifier 380, the resistor 381, the resistor 382, the resistor 383 and the resistor 384 constitute a subtraction circuit. Furthermore, the output of the operational amplifier 380 is output as the second triangular wave signal Vt2 via the switch 385 that turns ON when the output of the RS latch 328 is H level. The second triangular wave signal Vt2 is grounded through the resistor 386 when the switch 385 is OFF.

Figure 8:
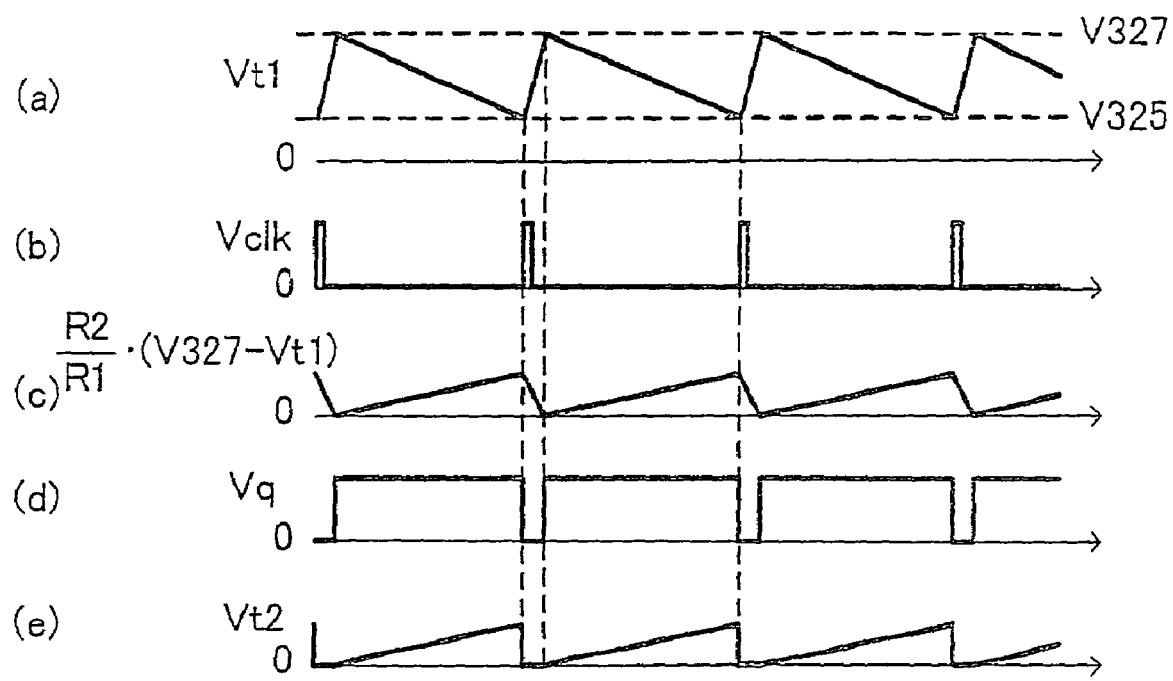
FIG. 8 is a waveform diagram showing the operations of the main sections of the oscillation circuit of the multi-output power supply in accordance with the third embodiment of the present invention.

FIG. 8 is a waveform diagram showing the operations of the main sections of the oscillation circuit 38 shown in FIG. 7. In FIG. 8, (a) shows the first triangular wave signal Vt1, (b) shows the clock signal Vclk, (c) shows the output of the operational amplifier 380, (d) shows the output Vq of the RS latch 328, and (e) shows the second triangular wave signal Vt2.

A method for generating the second triangular wave signal Vt2 using the oscillation circuit 38 in accordance with the third embodiment will be described below referring to FIG. 8.

In the oscillation circuit 38 in accordance with the third embodiment, it is assumed that the resistance values of the resistor 381 and the resistor 383 are equal and set at R1 and that the resistance values of the resistor 382 and the resistor 384 are equal and set at R2. In this case, the output Vop of the operational amplifier 380 is represented by the following expression (4).

$$Vop=(R2/R1)\cdot(V327-Vt1) \quad (4)$$

Since the first triangular wave signal Vt1 has a waveform that increases/decreases while the voltage V327 is used as the upper limit, the output ((c) of FIG. 8) of the operational amplifier 380 has a waveform obtained by inverting the first triangular wave signal Vt1 and by multiplying the inverted signal by (R2/R1) while zero is used as the lower limit. When the switch 385 is ON, in other words, when the output Vq of the RS latch 328 is H level, the first triangular wave signal Vt1 is lowering from the voltage V327, and the output of the operational amplifier 380 is rising from zero. When the switch 385 is OFF, in other words, when the output Vq of the RS latch 328 is L level, the first triangular wave signal Vt1 is rising from the voltage V327, and the output of the operational amplifier 380 is lowering from the peak value. However, at this time, the second triangular wave signal Vt2 is lowered to zero via the resistor 386. In this way, the second triangular wave signal Vt2 is generated.

As described in the first embodiment and the second embodiment described above, the second triangular wave signal Vt2 is calculated with the second control signal Ve2 and compared with a current signal Vc, whereby the second drive signal V21 is generated. The second triangular wave signal Vt2 is used for slope compensation to avoid subharmonic oscillation. It is known that subharmonic oscillation is a phenomenon peculiar to the current mode control system wherein the switching frequency is fixed and that the phenomenon occurs in the case that the duty ratio is 0.5 or more. Conversely, in the case that the duty ratio is 0.5 or less, slope compensation is not necessary. When the output Vq of the RS latch 328 is L level and when the first triangular wave signal Vt1 is rising from the voltage V325, the second triangular wave signal Vt2 is dropped to zero. This period is a period immediately after the clock signal Vclk rises and the drive signal V21 becomes H level. In other words, this period is a period during which slope compensation is not necessary. For this reason, it is understood that the period during which the second triangular wave signal Vt2 is rising and slope compensation is effective, in other words, the period during which the first triangular wave signal Vt1 is lowering from the voltage V327, should only be equal to or more than the half of one cycle.

As described above, in the oscillation circuit 38 of the multi-output power supply in accordance with the third embodiment of the present invention, the second triangular wave signal Vt2 required for the slope compensation of the second converter section 4 conforming to the current mode control system is generated from the first triangular wave signal Vt1 required for controlling the first converter section 2 conforming to the voltage mode control system. Hence, it is possible to reduce the number of the components of the oscillation circuit, such as a capacitor.

In the embodiments described above, the configuration and operation of the multi-output power supply formed of a step-down switching power supply has been described. However, since the gist of the present invention relates to the configuration of the control circuit of each converter, the type of the switching power supply should not be limited to this step-down type. The fact remains that, in comparison with the voltage mode control system, the current mode control system can obtain quick responsiveness without being affected by the LC resonance frequency regardless of the type of the switching power supply.

Figure 9:
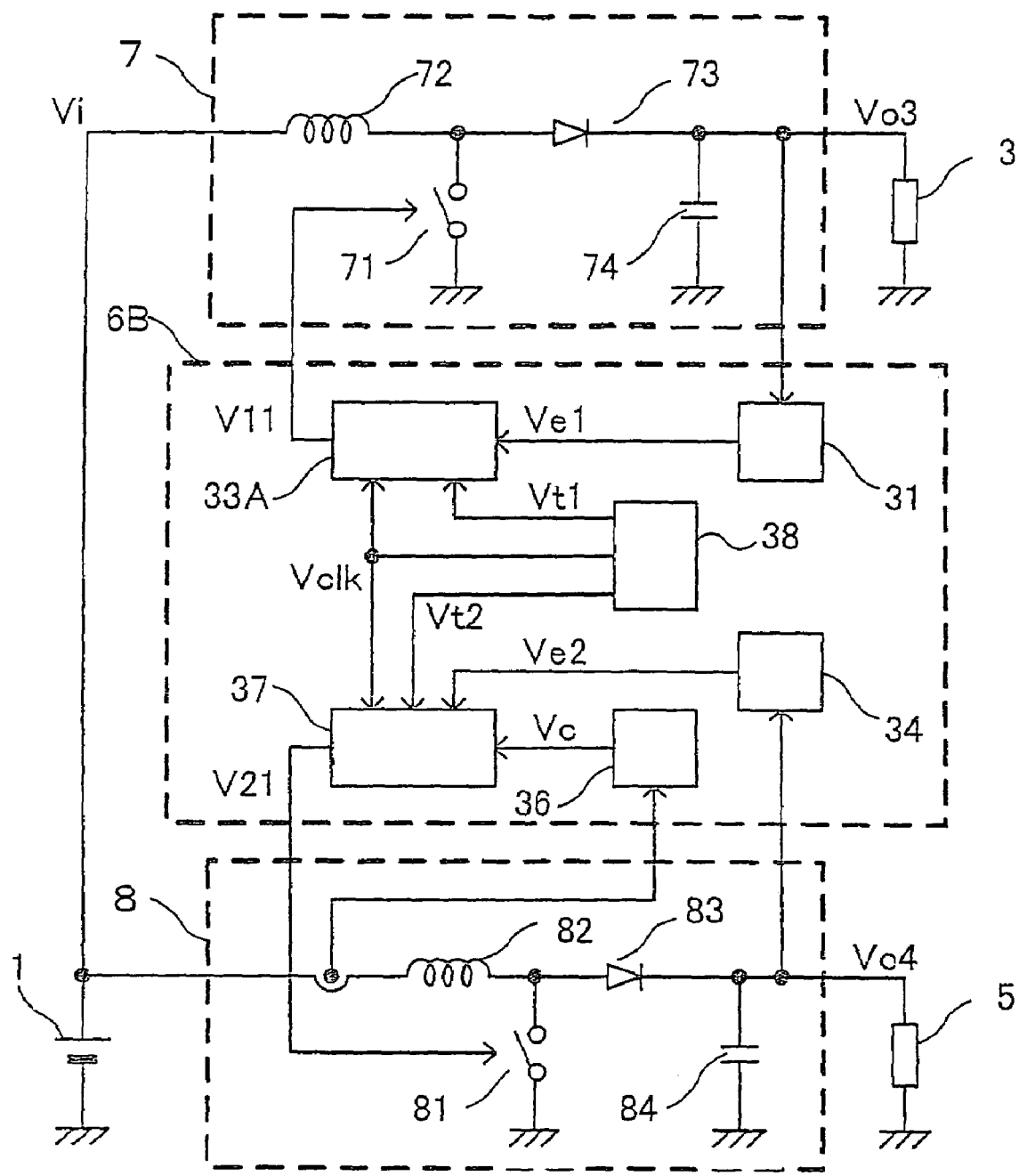
FIG. 9 is a circuit diagram showing the configuration of a multi-output power supply in accordance with another embodiment of the present invention.

For example, FIG. 9 is a circuit diagram showing an example wherein both the first and second converter sections are formed of a step-up switching power supply. Since the control operation of the step-up switching power supply shown in FIG. 9 is similar to that of the third embodiment, its description is omitted.

In a first converter section 7, when a switch 71 is ON, current flows from an input power supply 1 through an inductor 72 to the switch 71, returning to the input power supply 1. Hence, magnetic energy is stored in the inductor 72. When the switch 71 is OFF, current flows from the input power supply 1 through the inductor 72, a rectifier 73 to an output capacitor 74 and a load 3, returning to the input power supply 1. Hence, the magnetic energy of the inductor 72 is released, and a power is supplied to the load 3. A stable power is thus supplied to the load 3 by the periodic repetition of the above-mentioned ON/OFF operation of the switch 71. When it is assumed that the ratio of the ON time in one switching cycle of the switch 71 is duty ratio δ, the relationship between the input DC voltage Vi and the output DC voltage Vo3 is represented by the following expression (5).

$$Vo3 = Vi/(1-\delta) \quad (5)$$

Therefore, the output DC voltage Vo3 can be controlled by adjusting the duty ratio δ of the switch 71. In Expression (5), it is assumed that the voltage drop at the time when each of the components, such as the switch 71, is ON is negligible. Since the operation of a second converter section 8 is similar to that of the first converter section 7, its description is omitted.

In the multi-output power supply in accordance with the present invention configured as shown in FIG. 9, the first converter section 7 conforming to the voltage mode control system and the second converter section 8 conforming to the current mode control system are provided in parallel so as to be capable of supplying stable powers to respective loads having different specifications required. Furthermore, since the first converter section 7 and the second converter section 8 operate synchronously, a single switching frequency is used. Therefore, there is no occurrence of a beat phenomenon, and countermeasures against noise can be taken easily. Moreover, in the multi-output power supply configured as described above, the number of components can be reduced significantly, and a device incorporating the circuit can be made small in size.

<<Fourth Embodiment>>

A multi-output power supply in accordance with a fourth embodiment of the present invention will be described below referring to the accompanying drawings.

Figure 10:
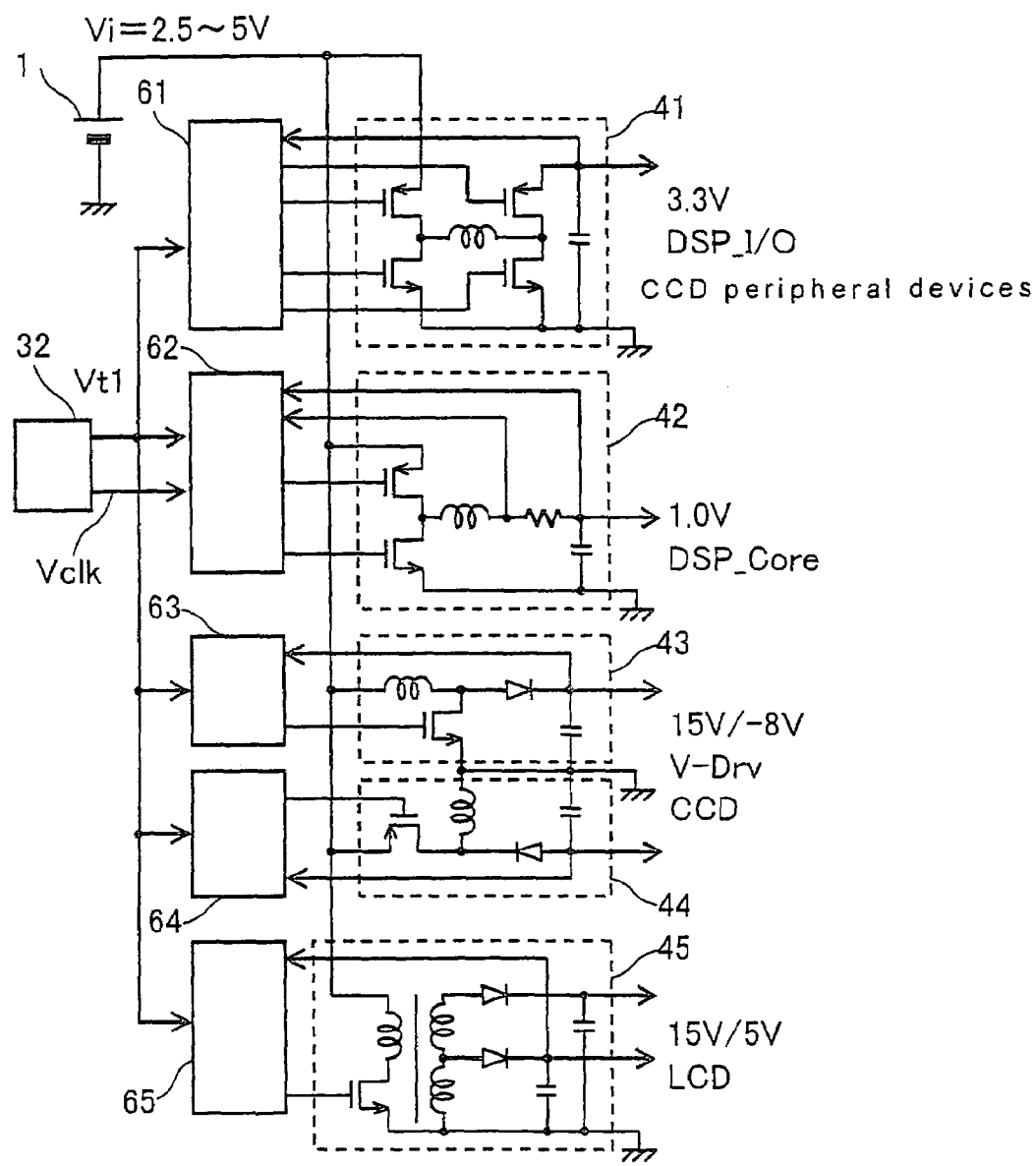
FIG. 10 is a circuit diagram showing an example wherein a multi-output power supply in accordance with a fourth embodiment of the present invention is applied to an electronic device.
Figure 11:
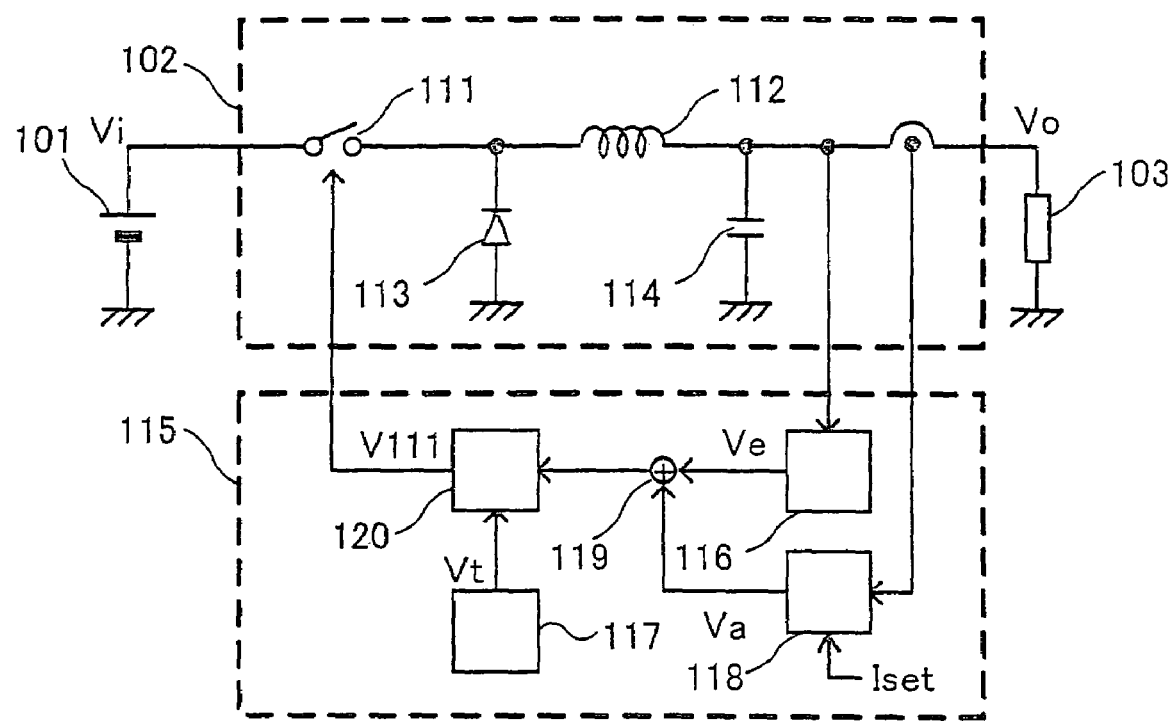
FIG. 11 is the circuit diagram showing the configuration of the conventional step-down switching power supply.
Figure 12:
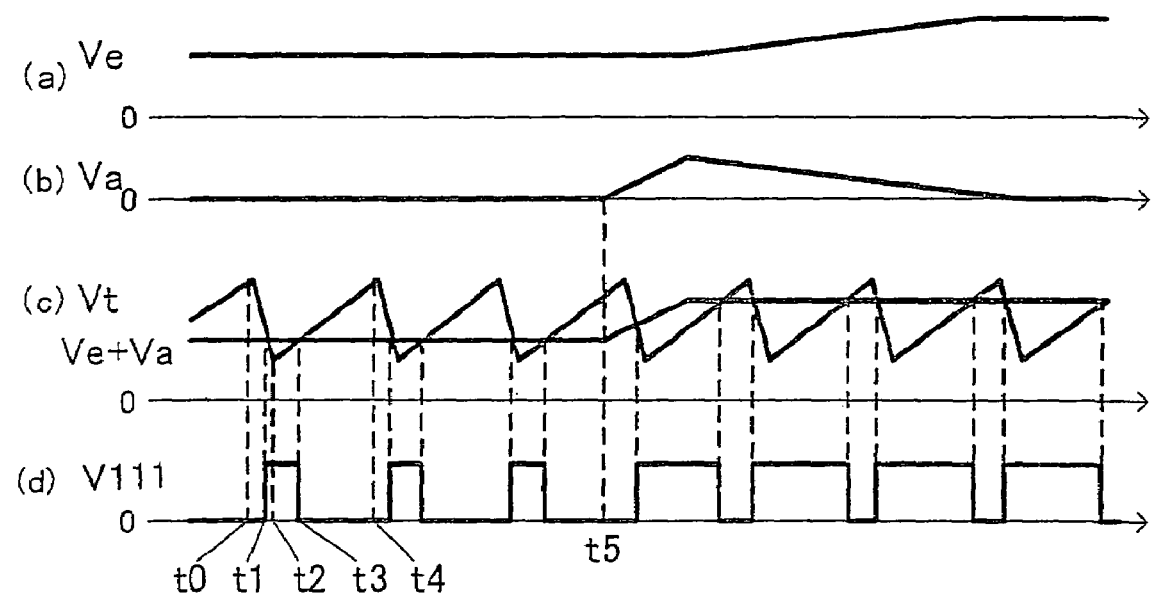
FIG. 12 is the waveform diagram showing the operations of the main sections of the control section of the conventional step-down switching power supply.

FIG. 10 is a circuit diagram showing the configuration of the multi-output power supply in accordance with the fourth embodiment. This is an example wherein the multi-output power supply is applied to a power supply for a digital still camera serving as an electronic device. In FIG. 10, an input power supply 1 is formed of a lithium-ion battery having one cell, and its input DC voltage Vi is 2.5 to 5 V DC. A first oscillation circuit 32 outputs a first triangular wave signal Vt1 and a clock signal Vclk.

In FIG. 10, a first converter section 41 supplies 3.3 V DC to the drive circuit of a lens motor, the input/output interface circuit of a DSP (digital signal processor) and the peripheral devices of a CCD (charge-coupled device) inside a digital still camera. The first converter section 41 is a step-up/down converter formed of an H-bridge, operating as a step-down converter when the input DC voltage Vi is higher than 3.3 V and operating as a step-up converter when the input DC voltage Vi is 3.3 V or less. A second converter section 42 has the configuration of a step-down converter and supplies 1.0 V DC to the DSP described above. A third converter section 43 has the configuration of a step-up converter and outputs 15 V DC. A fourth converter section 44 has the configuration of an inverting converter and outputs 8 V DC. The outputs of the third converter section 43 and the fourth converter section 44 are supplied to the CCD and its drive circuit. A fifth converter section 45 is formed of a flyback converter having two outputs and supplies 5 V DC and 15 V DC to a liquid crystal display drive circuit.

In FIG. 10, the output voltage of the first converter section 41 and the first triangular wave signal Vt1 are input to a first control section 61, and the first control section 61 controls the ON/OFF operation of switches inside the first converter section 41 to stabilize the output voltage of the first converter section 41 to 3.3 V DC. The output voltage of the second converter section 42, the current signal obtained by detecting an inductor current inside the second converter section 42, the first triangular wave signal Vt1 and the clock signal Vclk output from the first oscillation circuit 32 are input to a second control section 62.

The second control section 62 controls the ON/OFF operation of switches inside the second converter section 42 so as to stabilize the output voltage of the second converter section 42 to 1.0 V DC.

The output voltage of the third converter section 43 and the first triangular wave signal Vt1 of the first oscillation circuit 32 are input to a third control section 63, and the third control section 63 controls the ON/OFF operation of switches inside the third converter section 43 so as to stabilize the output voltage of the third converter section 43 to 15 V DC.

The output voltage of the fourth converter section 44 and the first triangular wave signal Vt1 of the first oscillation circuit 32 are input to a fourth control section 64, and the fourth control section 64 controls the ON/OFF operation of switches inside the fourth converter section 44 so as to stabilize the output voltage of the fourth converter section 44 to −8 V DC.

The output voltage of the fifth converter section 45 and the first triangular wave signal Vt1 of the first oscillation circuit 32 are input to a fifth control section 65, and the fifth control section 65 controls the ON/OFF operation of switches inside the fifth converter section 45 so as to stabilize the output voltages of the fourth converter section 45 to 5 V DC and 15 V DC.

The control sections 61, 63, 64 and 65, other than the second control section 62, conform to the voltage mode control system having the first detection circuit 31 and the first pulse-width modulation circuit 33 in accordance with the first embodiment described above.

The first control section 61 is provided with two pulse-width modulation circuits so as to be used in the case that the first converter section 41 operates as a step-down converter and in the case that the first converter section 41 operates as a step-up converter. On the other hand, the second control section 62 conforms to the current mode control system and comprises the second detection circuit 34, the second oscillation circuit 35, the current detection circuit 36 and the second pulse-width modulation circuit 37 in accordance with the first embodiment shown in FIG. 1. Since the operation of the second control section 62 is similar to the operation of the control section 6 in accordance with the first embodiment shown in FIG. 1, its description is omitted.

The second converter section 42 shown in FIG. 10 is configured so as to detect the inductor current using a resistor. Hence, in the second control section 62 of the multi-output power supply in accordance with the fourth embodiment, being used for the electronic device, the second pulse-width modulation circuit 37 compares the second control signal Ve2 output from the second detection circuit 34 with the current signal Vc output from the current detection circuit 36. For this purpose, the current detection circuit 36 amplifies the voltage drop owing to the above-mentioned resistor of the second converter section 42, shifts its level, and outputs the current signal Vc.

With the above-mentioned configuration, a step-down converter conforming to the current mode control system and having high responsiveness can be used as the second converter section 42 that has a low output voltage of 1.0 V DC and supplies a power to the DSP having a large load fluctuation in synchronization with the switching operations of all the converter sections.

As described in the respective embodiments described above, the multi-output power supply in accordance with the present invention comprises a converter conforming to the voltage mode control system and a converter conforming to the current mode control system, provided in parallel and operating synchronously. Therefore, the multi-output power supply is applicable to an electronic device having an electronic circuit, such as a DSP, the operation current of which changes significantly depending on specifications required for diversified load circuits, for example, depending on multiple operation modes.

The multi-output power supply in accordance with the present invention comprises a switching power supply conforming to the voltage mode control system and a switching power supply conforming to the current mode control system, provided in parallel. The switching power supply conforming to the current mode control system and having high responsiveness is used for a load, the output specifications of which changes. Furthermore, the respective switching power supplies are controlled suitably in synchronization. Therefore, this configuration is useful for a multi-output power supply that is required to meet diversified output specifications of multiple loads to reduce power consumption.

Although the present invention has been described with respect to its preferred embodiments in some detail, the disclosed contents of the preferred embodiments may change in the details of the structure thereof, and any changes in the combination and sequence of the component may be attained without departing from the scope and spirit of the claimed invention.

The invention claimed is:

1. A multi-output power supply comprising:

an input power supply, a first converter section having a first switch, a first inductor and a first rectifier, to which a power is supplied from said input power supply and from which a first output voltage is output, a first detection circuit for outputting a first control signal corresponding to said first output voltage, a first oscillation circuit for outputting a first triangular wave signal having a predetermined frequency and a clock signal synchronized with said first triangular wave signal, a first pulse-width modulation circuit for outputting a first drive signal for turning ON or OFF said first switch by comparing at least said first control signal with said first triangular wave signal, a second converter section having a second switch, a second inductor and a second rectifier, to which a power is supplied from said input power supply and from which a second output voltage is output, a second detection circuit for outputting a second control signal corresponding to said second output voltage, a second oscillation circuit for outputting a second triangular wave signal synchronized with said clock signal, a current detection circuit for outputting a current signal corresponding to the current flowing in said second inductor, and a second pulse-width modulation circuit for generating and outputting a second drive signal for turning ON said second switch depending on said clock signal and for turning OFF said second switch depending on at least the signal obtained by comparing said second control signal with said current signal.

2. The multi-output power supply in accordance with claim 1, wherein said first pulse-width modulation circuit turns ON said first switch depending on the signal obtained by comparing said first control signal with said first triangular wave signal and turns OFF said first switch depending on said clock signal.

3. The multi-output power supply in accordance with claim 1, wherein said second pulse-width modulation circuit generates and outputs said second drive signal for turning OFF said second switch depending on the signal obtained by comparing the signal obtained by subtracting said second triangular wave signal from said second control signal with said current signal.

4. The multi-output power supply in accordance with claim 1, wherein said second pulse-width modulation circuit generates and outputs said second drive signal for turning OFF said second switch depending on the signal obtained by comparing the signal obtained by adding said second triangular wave signal to said current signal with said second control signal.

5. A multi-output power supply comprising:

an input power supply, a first converter section having a first switch, a first inductor and a first rectifier, to which a power is supplied from said input power supply and from which a first output voltage is output, a first detection circuit for outputting a first control signal corresponding to said first output voltage, an oscillation circuit for outputting a first triangular wave signal having a predetermined frequency, a second triangular wave signal synchronized with said first triangular wave signal and a clock signal synchronized with said first triangular wave signal, a first pulse-width modulation circuit for outputting a first drive signal for turning ON or OFF said first switch by comparing said first control signal with said first triangular wave signal, a second converter section having a second switch, a second inductor and a second rectifier, to which a power is supplied from said input power supply and from which a second output voltage is output, a second detection circuit for outputting a second control signal corresponding to said second output voltage, a current detection circuit for outputting a current signal corresponding to the current flowing in said second inductor, and a second pulse-width modulation circuit for generating and outputting a second drive signal for turning ON said second switch depending on said clock signal and for turning OFF said second switch depending on the signal obtained by calculating or comparing said second control signal, said second triangular wave signal and said current signal.

6. The multi-output power supply in accordance with claim 5, wherein said first pulse-width modulation circuit turns ON said first switch depending on the signal obtained by comparing said first control signal with said first triangular wave signal and turns OFF said first switch depending on said clock signal.

7. The multi-output power supply in accordance with claim 5, wherein said oscillation circuit generates said second triangular wave signal on the basis of the difference between a predetermined reference value and said first triangular wave signal.

8. The multi-output power supply in accordance with claim 5, wherein said second pulse-width modulation circuit generates and outputs said second drive signal for turning OFF said second switch depending on the signal obtained by comparing the signal obtained by subtracting said second triangular wave signal from said second control signal with said current signal.

9. The multi-output power supply in accordance with claim 5, wherein said second pulse-width modulation circuit generates and outputs said second drive signal for turning OFF said second switch depending on the signal obtained by comparing the signal obtained by adding said second triangular wave signal to said current signal with said second control signal.

10. The electronic device comprising a multi-output power supply in accordance with claim 1 or 5 and an electronic circuit having multiple operation modes requiring different operation currents, wherein said second output voltage output from said second converter section of said multi-output power supply is supplied to said electronic circuit.

* * * * *